United States Patent
Hirabayashi

(10) Patent No.: US 7,190,481 B2
(45) Date of Patent: Mar. 13, 2007

(54) SERVER DEVICE, A USER TERMINAL, AND A METHOD OF PROVIDING DIGITAL CONTENTS FROM THE SERVER DEVICE TO THE USER TERMINAL

(75) Inventor: Shinji Hirabayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 851 days.

(21) Appl. No.: 10/107,583

(22) Filed: Mar. 28, 2002

(65) Prior Publication Data

US 2003/0046268 A1 Mar. 6, 2003

(30) Foreign Application Priority Data

Mar. 29, 2001 (JP) .......................... P2001-094735

(51) Int. Cl.
G06F 17/60 (2006.01)
G06F 15/00 (2006.01)

(52) U.S. Cl. ..................................... 358/1.18; 358/537

(58) Field of Classification Search ............... 358/403, 358/1.15, 537, 1.18; 716/517; 709/203
See application file for complete search history.

(56) References Cited

U.S. PATENT DOCUMENTS 5,845,302 A * 12/1998 Cyman et al. ............... 715/517

| | | | |
|---|---|---|---|
| 6,247,011 B1 * | 6/2001 | Jecha et al. | 707/9 |
| 6,260,040 B1 * | 7/2001 | Kauffman et al. | 707/10 |
| 6,297,891 B1 * | 10/2001 | Kara | 358/405 |
| 6,901,427 B2 * | 5/2005 | Teshima | 709/203 |
| 2002/0057454 A1 * | 5/2002 | Ueda et al. | 358/1.15 |
| 2002/0194302 A1 * | 12/2002 | Blumberg | 709/217 |
| 2004/0227960 A1 * | 11/2004 | Farros et al. | 358/1.1 |

FOREIGN PATENT DOCUMENTS

| JP | A 11-091189 | 4/1999 |
|---|---|---|
| JP | A 11-224285 | 8/1999 |
| JP | A 2000-148435 | 5/2000 |

* cited by examiner

Primary Examiner—Gabriel I. Garcia
(74) Attorney, Agent, or Firm—Oliff & Berridge, PLC

(57) ABSTRACT

An editor server in a server transmits a layout image to a user PC. An image editor in the user PC sets the layout of a print image in accordance with the layout image and an edit command entered by the user through an input device. When the user enters a print start command through the input device, the editor server transmits the layout information defining the layout of the print image at the point in time to the editor server. The editor server puts the layout information into a file in the server and after completion of transmission of an original image container to the user PC, transmits the layout information file to the user PC. Print OCX in the user PC prepares a print image based on original image data in the original image container and the layout information in the layout information file, and requests a printer driver to print.

19 Claims, 32 Drawing Sheets

FIG. 2

CONTENTS DATABASE

| CONTENTS ID | IMAGE SIZE ID | ATTRIBUTE INFORMATION | STORAGE LOCATION OF ORIGINAL IMAGE | STORAGE LOCATION OF LAYOUT IMAGE DATA |
|---|---|---|---|---|
| 001 | SIZE 01 | ¥500 | | |
| | SIZE 02 | ¥1000 | | |
| | SIZE 03 | ¥1000 | | |
| 002 | SIZE 01 | NO CHARGE | | |
| | SIZE 02 | NO CHARGE | | |
| | SIZE 03 | NO CHARGE | | |
| 003 | SIZE 01 | ¥1000 | | |
| | SIZE 02 | ¥1500 | | |
| | SIZE 03 | ¥2000 | | |

FIG. 3

MEMBERSHIP DATABASE

| USER ID | | | | |
|---|---|---|---|---|
| PASSWORD | | | | |
| ADDRESS | | | | |
| NAME | | | | |
| AGE | | | | |
| E-MAIL | | | | |
| LOGIN NOW ? | | | | |

FIG. 4

PRINTER DRIVER DATABASE

| PRINTER ID | |
|---|---|
| DRIVER NAME | |
| OS ID | |
| COMPATIBLE PAPER SIZE | |
| COMPATIBLE PAPER TYPE | |
| COMPATIBLE LEFT MARGIN | |
| COMPATIBLE RIGHT MARGIN | |
| COMPATIBLE TOP MARGIN | |
| COMPATIBLE BOTTOM MARGIN | |
| MAXIMUM INPUT RESOLUTION | |
| PAPER FEEDING WAY | |

FIG. 5

SESSION ID MANAGEMENT TABLE

| SESSION ID | | | | |
|---|---|---|---|---|
| USER ID | | | | |
| CONTENTS ID | | | | |
| IMAGE SIZE ID | | | | |
| OS ID | | | | |

FIG. 6

PRINT LAYOUT INFORMATION FILE

| LAYOUT ID | |
|---|---|
| LAYOUT INFORMATION | |
| USER ID | |
| SESSION ID | |
| ORIGINAL IMAGE CONTAINER STORAGE LOCATION | |

FIG. 7

PAYMENT STATE MANAGEMENT TABLE

| USER ID | |
|---|---|
| LAYOUT ID | |
| NAME | |
| ADDRESS | |
| AGE | |
| E-MAIL | |
| CARD TYPE | |
| VALID PERIOD OF CARD | |
| CARD NUMBER | |
| PAYMENT AMOUNT | |
| ISSUANCE DATE | |
| SALES CONFIRMATION FLAG | |
| | |

FIG. 8

REPRINT REASON TABLE

| LAYOUT ID | |
|---|---|
| REPRINT REASON ID | |
| REPRINT REASON | |

SERVER DEVICE, A USER TERMINAL, AND A METHOD OF PROVIDING DIGITAL CONTENTS FROM THE SERVER DEVICE TO THE USER TERMINAL

BACKGROUND OF THE INVENTION

This invention relates to a technique for transmitting digital contents from a server via a network to a user terminal for selling the digital contents.

In recent years, copyrighted articles (copyrighted articles in text, music, art, graphics, movie, photo and so on) fixed to carriable media such as paper media of books, etc., and computer-readable media of CD-ROM, etc., and sold have been put into communicatable form as digital data form and sold through a computer network with the widespread use of computer networks typified by the Internet and improvement of the law infrastructure for regulating electronic commerce through the computer network. The copyrights of such copyrighted articles put into communicatable form as digital data form (which will be hereinafter referred to as digital contents) are easily violated because of the essential feature of digital data that the same articles can be copied completely. Therefore, to provide such digital contents, it is necessary to prevent replication exceeding the licensed range from the copyright holders; on the other hand, it is also necessary to guarantee use of the copyrighted articles by the user in the range. However, if too much importance is put on the copyright holder protection, an excessive burden (forcible disclosure of private information, purchase of unsatisfactory copyrighted article, etc.,) is imposed on information, purchase of unsatisfactory copyrighted article, etc.,) is imposed on the user and consequently the user may be disgusted with purchase of digital contents using the computer network. On the other hand, if too much importance is put on the user protection, room is left for the user to commit illegal use of copyrighted articles (illegal getting by circumventing charging, use exceeding the permitted number of times, use in unauthorized use mode, etc.,) and consequently selling copyrighted articles using the computer network may be circumvented. Therefore, to promote use of such a business model, it is important to bring copyright holder protection and user protection into balance.

By the way, to provide the user with image data for a printer to print copyrighted articles of photo, art, or graphics as the above-described digital contents, the user is allowed to execute various types of print with the image data as material in such a manner that a calendar is added to the image data for printing, that any desired message is added to the image data for printing, etc., if the copyright holder permits. Permission of such arrangement makes it possible to fuel new demands for copyrighted articles and also leads to the profit of the copyright holder if the arrangement is within the scope intended by the copyright holder. A print program for generating a print image passed to a printer driver for a printer in a user terminal also requires not only the above-mentioned image data, but also layout information for defining placement of the image data, text, or a calendar on printed matter as indispensable data for printing.

However, if such layout information is generated on the user terminal and is passed directly to the print program, the possibility of not only layout arrangement, but also alteration exceeding the scope intended by the copyright holder occurs. Such alteration violates the identity holding right of the copyright holder and thus cannot be left at user's disposal.

SUMMARY OF THE INVENTION

It is therefore an object of the invention to provide a digital contents providing system capable of sending layout information from a user terminal to a server device before digital contents is printed, putting the layout information into a file in accordance with a predetermined format in the server device, and permitting the user terminal to execute only print using the layout information put into the file, a digital contents providing method using such a digital contents providing system, a server device forming a part of such a digital contents providing system, and a digital contents providing program for causing a computer to function as such a server device.

In order to achieve the above object, according to the present invention, there is provided a digital contents providing system, comprising:
  a user terminal; and
  a server device communicatable with the user terminal via a network, the server device transmitting digital contents to the user terminal in response to a request issued from the user terminal, wherein:
  the user terminal includes:
    a processor, which executes processing according to a program;
    an input device, which inputs various instruction to the processor in accordance with a user's operation;
    a communicator, which communicates with the server device via the network;
    a printer, which performs printing while being controlled by the processor; and
    a storage medium;
  the server device includes:
    a processor, which executes processing according to a program;
    a communicator, which communicates with the user terminal via the network; and
    a storage medium, which stores the digital contents and samples thereof;
  the storage medium in the user terminal stores a client program which causes the processor in the user terminal to:
    request acquisition of a sample of the digital contents to the server device, in response to an instruction inputted through the input device;
    edit a print image layout including a sample transmitted from the server device, in response to an edit instruction inputted through the input device;
    transmit layout information indicating the print image layout to the server device, in response to a print instruction inputted through the input device;
    prepare a print image based on image data of the digital contents and a layout information file which are transmitted from the server device; and
    cause the printer to print the print image; and
  the storage medium in the server device stores a server program which causes the processor in the user terminal to:
    transmit a sample of the digital contents to the user terminal, in response to the acquisition request;
    prepare a layout information file based on layout information transmitted from the user terminal; and
    transmit the layout information file to the user terminal after transmitting image data of the digital contents to the user terminal.

According to the present invention, there is also provided a method of providing digital contents from a server device to a user terminal, which is communicatable with the server device via a network, in response to a request issued from the user terminal, the method comprising the steps of:

causing the user terminal to request acquisition of a sample of the digital contents to the server device, in response to an instruction inputted through an input device;

causing the server device to transmit the sample of the digital contents to the user terminal, in response to the acquisition request;

causing the user terminal to edit a print image layout including a sample transmitted from the server device, in response to an edit instruction inputted through the input device;

causing the user terminal to transmit layout information indicating the print image layout to the server device, in response to a print instruction inputted through the input device;

causing the service device to prepare a layout information file based on layout information transmitted from the user terminal;

causing the service device to transmit the layout information file to the user terminal after transmitting image data of the digital contents to the user terminal;

causing the user terminal prepare a print image based on image data of the digital contents and a layout information file which are transmitted from the server device; and causing the printer to print the print image.

According to the present invention, there is also provided a server device, comprising:

a processor, which executes processing according to a program;

a communicator, which communicates with a user terminal connected via a network; and a storage medium, which stores the digital contents and samples thereof, the storage medium storing a server program which causes the processor in the user terminal to:

transmit a sample of the digital contents to the user terminal, when a request is transmitted from the user terminal;

prepare a layout information file based on layout information transmitted from the user terminal; and transmit the layout information file to the user terminal after transmitting image data of the digital contents to the user terminal.

According to the present invention, there is also provided, a computer program for a server device which comprises: a processor, which executes processing according to a program; a communicator, which communicates with a user terminal connected via a network; and a storage medium, which stores the digital contents and samples thereof, the computer program causing the processor to execute the steps of:

transmitting a sample of the digital contents to the user terminal, when a request is transmitted from the user terminal;

preparing a layout information file based on layout information transmitted from the user terminal; and transmitting the layout information file to the user terminal after transmitting image data of the digital contents to the user terminal.

A computer-readable record medium recording the above-mentioned program is also within the scope of the invention. Further, if the above-mentioned program is implemented by a program of the OS, etc., operating in a computer system, the record medium recording a program containing various instructions for controlling the program of the OS, etc., is also within the scope of the invention.

According to the above-mentioned configuration, when a print command is entered, the layout information indicating the layout edited using the sample of digital contents in the user terminal is once transmitted to the server device and is put into a file in the server device. Therefore, if the user edits the print image beyond the range essentially permitted using some tool, information indicating such an edit result will cause a syntax error to occur when the server device puts the layout information into a file and thus the information is removed. That is, as the layout information is put into a file in the server device, the layout of printed matter output from the printer of the user terminal can be managed. After the digital contents is transmitted to the user terminal, namely, just before actual print is executed, the layout information put into a file is transmitted from the server device to the user terminal, a print image is generated in accordance with the layout information and the image of the digital contents, and print processing is executed. Therefore, printing which violates the identify holding right of the copyright holder is prevented.

In the invention, the digital contents may be transmitted from the server device to the user terminal just after the layout information is put into a file or when a request is again issued from the user terminal after the layout information is put into a file.

BRIEF DESCRIPTION OF THE DRAWINGS

In the accompanying drawings,

FIG. 2 is a drawing to show the structure of a contents database shown in FIG. 1;

FIG. 3 is a drawing to show the structure of a membership database shown in FIG. 1;

FIG. 4 is a drawing to show the structure of a printer driver database shown in FIG. 1;

FIG. 5 is a drawing to show the structure of a session ID management table shown in FIG. 1;

FIG. 6 is a drawing to show the structure of a print layout information file shown in FIG. 1;

FIG. 7 is a drawing to show the structure of a payment state management table shown in FIG. 1;

FIG. 8 is a drawing to show the structure of a re-print reason table shown in FIG. 1;

DETAILED DESCRIPTION OF THE PREFERRED EMBODIMENTS

An embodiment of a digital contents providing system according to the invention will be discussed with reference to the accompanying drawings. The business model incorporating the invention can be constructed on every computer network including conventional personal computer communication networks; the embodiment is an example wherein the digital contents providing system according to the invention is constructed on the Internet.

Figure 1:
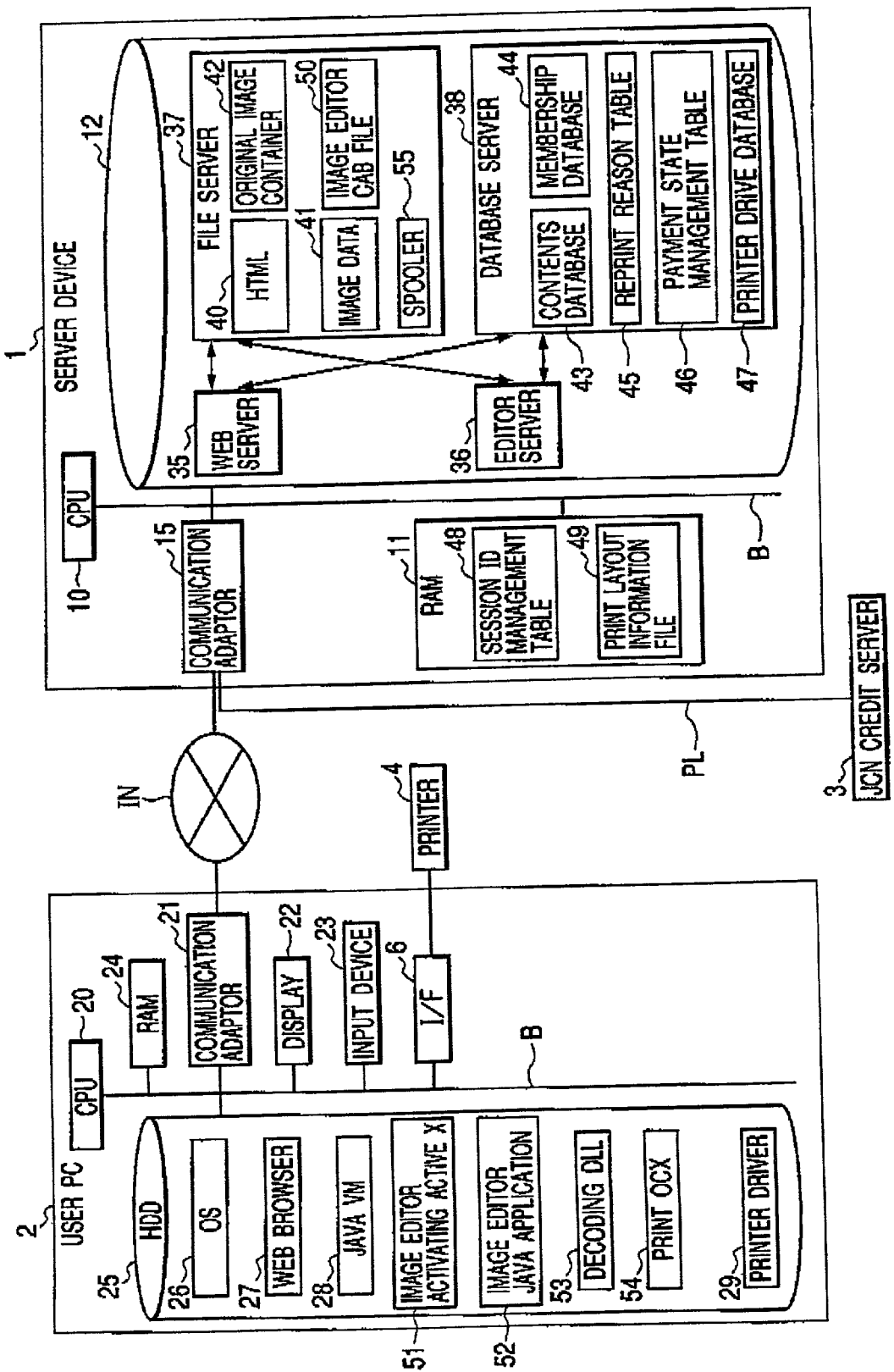
FIG. 1 is a block diagram to show the schematic configuration of a digital contents providing system of an embodiment of the invention.

FIG. 1 is a block diagram to show the schematic configuration of the digital contents providing system. The digital contents providing system in the example is made up of one server device 1 and a plurality of user PCs 2 (user terminals) that can communicate with each other through Internet IN and a credit server 3 connected to the server device 1 by a private line PL.

The server device 1 has an ordinal hardware configuration as an Internet server device and is managed and administrated by the trader selling copyrighted articles (specifically, copyrighted articles of photos and pictures) whose copyrights are held by the trader or consigned for sale to the trader (supplier) from other copyright holders.

Each user PC 2 has a hardware configuration as an ordinal personal computer that can access the Internet and is operated by a person who attempts to purchase a copyrighted article from the supplier (the person will be hereinafter referred to as the user).

The copyrighted articles sold by the supplier to the user are previously stored in the server device 1 in a transmittable form (specifically, as image data in JPEG format) and is transmitted to the user PC 2 of the user who wants to purchase and is automatically printed out by the user PC 2. The articles to be sold by the digital contents providing system strictly are printed matter output from a printer and the image data is used only to transmit the copyrighted articles via the Internet IN and the image data itself is not sold. In the description that follows, however, for easy understanding of the invention, it is adopted the expression that "digital contents" indicating the image data is "sold" for convenience.

The credit server 3 is managed and administrated by the certification organization commissioned by a plurality of credit card companies, has a database containing the correspondences between the card numbers of the credit cards issued by each credit card company and the names of the holders of the credit cards, and makes a reply as to whether or not the correspondence between the inquired card number and owner name is found as the identity in response to an inquiry from any of various Internet selling sites (including the server device 1).

Each user terminal 2 is made up of a CPU 20 (processor), a communication adapter 21 (communicator), a display 22, an input device 23, a RAM 24, a printer interface 6, and a hard disk 25 (storage medium) connected by a bus B. The CPU 20 is a central processor for controlling the whole user terminal 2. The communication adapter 21 is a modem, etc., for interfacing with a line of the Internet IN. The display 22 is a display for displaying an image generated by the CPU 20. The input device 23 consists of a keyboard and a mouse. The RAM 24 is main memory in which a work area for the CPU 20 to execute various programs is prepared. The printer interface 26 is a Centronics port or a USB port and is connected to a printer 4. The printer 4 is a printer capable of color printing (sublimation printer, laser printer, ink jet printer, etc.,).

The hard disk 25 stores various programs read and executed by the CPU 20. The programs previously stored on the hard disk 25 include an operating system 26, a Web browser 27 (browser program), a Java virtual machine 28, and a printer driver 29. The operating system 26 causes the CPU 20 to provide a function of conducting TCP/IP communications with the server device 1 through the communication adapter 21, a function of controlling the hardware devices making up the user terminal 2, and the like. The Web browser 27 causes the CPU 20 to provide functions of transmitting an HTTP request message to a specific WWW site (including a Web server 35 described later in the server device 1) using the communicating function of the operating system 26, interpreting a response message transmitted by the WWW site in response to the HTTP request message, displaying the Web contents contained in the response message contents (screen data of hypertext, JPEG, GIF, etc.,), and starting Active X control contained in the response message contents (including image editor activating Active X 51 in an image editor CAB file 50 described later). The Java virtual machine 28 causes the CPU 20 to execute processing complying with a Java class file (including an image editor Java application 52 in the image editor CAB file 50 described later) contained in the response message received from the Web site by the function of the Web browser 27. The printer driver 29 causes the CPU 20 to execute a function of receiving print image data from various application programs (including the Java virtual machine 28 for executing the image editor Java application 52), converting the print image data into print data, and causing the printer 4 to execute print. As the printer driver 29, only one corresponding to the printer 4 connected to the printer interface 6 needs to be stored. However, if a plurality of printers 4 are connected or it is intended that a plurality of printers 4 will be switched for use, a plurality of printer drivers 29 are stored. The processing contents of the Web browser 27, the image editor activating Active X 51, and the image editor Java application 52 will be discussed later in detail with a flowchart.

As the CPU 20 executes the above-mentioned applications, various pieces of data are further stored (cached) on the hard disk 25. For example, the data includes the image editor activating Active X 51, the image editor Java application 52, a decoding DLL 53, and a print OCX 54 in the image editor CAB file 50, various HTML files 40, various pieces of image data 41, various original image containers 42 storing digital contents in encryption form, a spooler 55 with a copy protecting function, and the like. The various types of data will be discussed later in detail.

The server device 1 has a CPU 10 (processor), RAM 11, a communication adapter 15 (communicator), and a hard disk 12 (storage medium) connected by a bus B as main hardware components. The CPU 10 is a central processor for controlling the whole server device 1. The communication adapter 11 is a communicator for interfacing with a line of the Internet IN and a private line PC.

The hard disk 12 stores various programs and various types of data read by the CPU 10 for execution. The data stored on the hard disk 12 includes various HTML files 40 defining formats of screens displayed by the Web browser 27, various image data (JPEG data, GIF data) file 41 with a link set in any HTML file 40, the above-mentioned image editor CAB file 50, the above-mentioned original image container 42, the above-mentioned spooler 55 with a copy protecting function, a contents database 43, a membership database 44, a reprint reason table 45, a payment state management table 46, and a printer driver database 47.

The original image container 42 is provided for each original image data (digital contents) to transmit an image sold using the server device 1. Each original image container 42 stores image data compressed in the JPEG format in a state in which the compressed image data is further encrypted in accordance with an encryption algorithm of DES, etc. In the hard disk 12, to each original image container 42, a key (container key) to decrypt the image data stored therein is related.

The image editor CAB file 50 (corresponding to a file of a client program) includes the image editor activating Active X 51, the image editor Java application 52, the decoding DLL 53, and the print OCX 54 as mentioned above. The decoding DLL 53 is a shared library including processing for decrypting the original image data in the above-mentioned original image container 42. The print OCX 54 is custom control for drawing a print image in the RAM 24 and transferring to the printer driver 29.

The spooler 55 with a copy protecting function is provided for each type of printer driver 29 and is a spooler that the printer driver 29 ordinarily has from which a print data copy function is excluded.

The contents database 43 is a database comprising entries provided in a one-to-one correspondence with the images to be sold, as shown in FIG. 2. Registered in each entry are contents ID of identification information of the image to be sold, the price (containing no charge) for each of image size IDs (e.g., size 01: A3, size 02: A4, and size 03: Postcard) corresponding to the image sizes of the original image data to transmit the images to be sold, attribute information indicating the attributes of the original image data (edit restricting condition, enable or disable of free layout, the number of pixels in the height direction of the original image data, the number of pixels in the width direction of the original image data, etc.,), the storage location (path name) of the original image container 42, and the storage location (path name) of layout image file (image data file 40 wherein the image to be sold is converted into data in a lower resolution than that of the original image data, namely, sample of digital contents).

The membership database 44 (user database) registers information of user ID of identification information uniquely granted, password, address, name, age, e-mail address, login information indicating whether or not the member is logging in, and the like. The login information is registered by a database server 38 described later, but other pieces of information are registered based on previous application from the member and thus are not confirmed for truth.

The printer driver database 47 registers the printer ID and driver name as identification information, the OS ID representing the operating system 26 corresponding to the printer driver 29, and capability information of the printer driver 29 (compatible paper size, compatible paper type, compatible left margin, compatible right margin, compatible top margin, compatible bottom margin, maximum input resolution, paper feeding way, etc.,) for each printer driver 29 for each printer supported by the digital contents providing system (namely, printer capable of printing based on digital contents with quality to such an extent that the copyright holder can recognize that the print does not come into collision with the identity holding right on the image to be sold), as shown in FIG. 4.

The reprint reason table 45 (see FIG. 8) and the payment state management table 46 (see FIG. 7) will be discussed later in detail together with the processing contents because data is not stored in the initial state and is stored as the CPU 10 executes processing.

Further, various programs are stored on the hard disk 12. The programs stored on the hard disk 12 include not only the operating system (not shown) containing a function of conducting TCP/IP communications with each user terminal 2 and the credit server 3 through the communication adapter 15, but also a file server 37, the database server 38, the Web server 35, and an editor server 36. These will be hereinafter collectively called server program.

The file server 37 causes the CPU 10 to execute read out processing of the HTML file 40, the image data file 41, the original image container 42, the image editor CAB file 50, and the spooler 55 with a copy protecting function described above in response to a request from the Web server 35 and the editor server 36.

The database server 38 causes the CPU 10 to access the contents database 43, the membership database 44, the reprint reason table 45, the payment state management table 46, and the printer driver database 47 described above (data storage, data reading, data update) in response to a request from the Web server 35 and the editor server 36.

The Web server 35 causes the CPU 10 to execute processing of receiving the corresponding data from the file server 37 or the database server 38 in response to the contents of an HTTP request message transmitted from the user PC 2 (Web browser 27) and returning the data to the requesting user PC 2 (Web browser 27) and processing of requesting the database server 38 to register the data contained in the message in each data base 43, 44, 47 or each table 45, 46 and returning the processing result to the requesting user PC 2 (Web browser 27).

The editor server 36 causes the CPU 10 to execute processing of communicating with the Java virtual machine 28 executed in accordance with the image editor Java application 52 by the CPU 20 of the user PC 2 (hereinafter, simply the image editor 52), receiving the corresponding data from the file server 37 or the database server 38 in response to a request from the image editor 52, and returning the data to the requesting user PC 2 (Web browser 27) and processing of requesting the database server 38 to register the data contained in the message in each data base 43, 44, 47 or each table 45, 46.

The processing contents of the Web server 35 and the editor server 36 will be discussed later in detail based on a flowchart.

The RAM 11 is main memory in which a work area for the CPU 10 to execute various types of processing is provided. A session ID management table 48 (see FIG. 5) and a print layout information file 49 (see FIG. 6) are temporarily prepared in the ROM 11 as the CPU 10 executes the Web server 35 and the editor server 36 described above. The session ID management table 48 and the print layout information file 49 will be discussed later in detail together with the processing contents of the Web server 35 and the editor server 36.

The processing contents of the Web browser 27, the image editor 52 (the Java virtual machine 28 and the image editor Java application 52), the Web server 35, and the editor server 36 described above will be discussed with reference to flowcharts.

Figure 9:
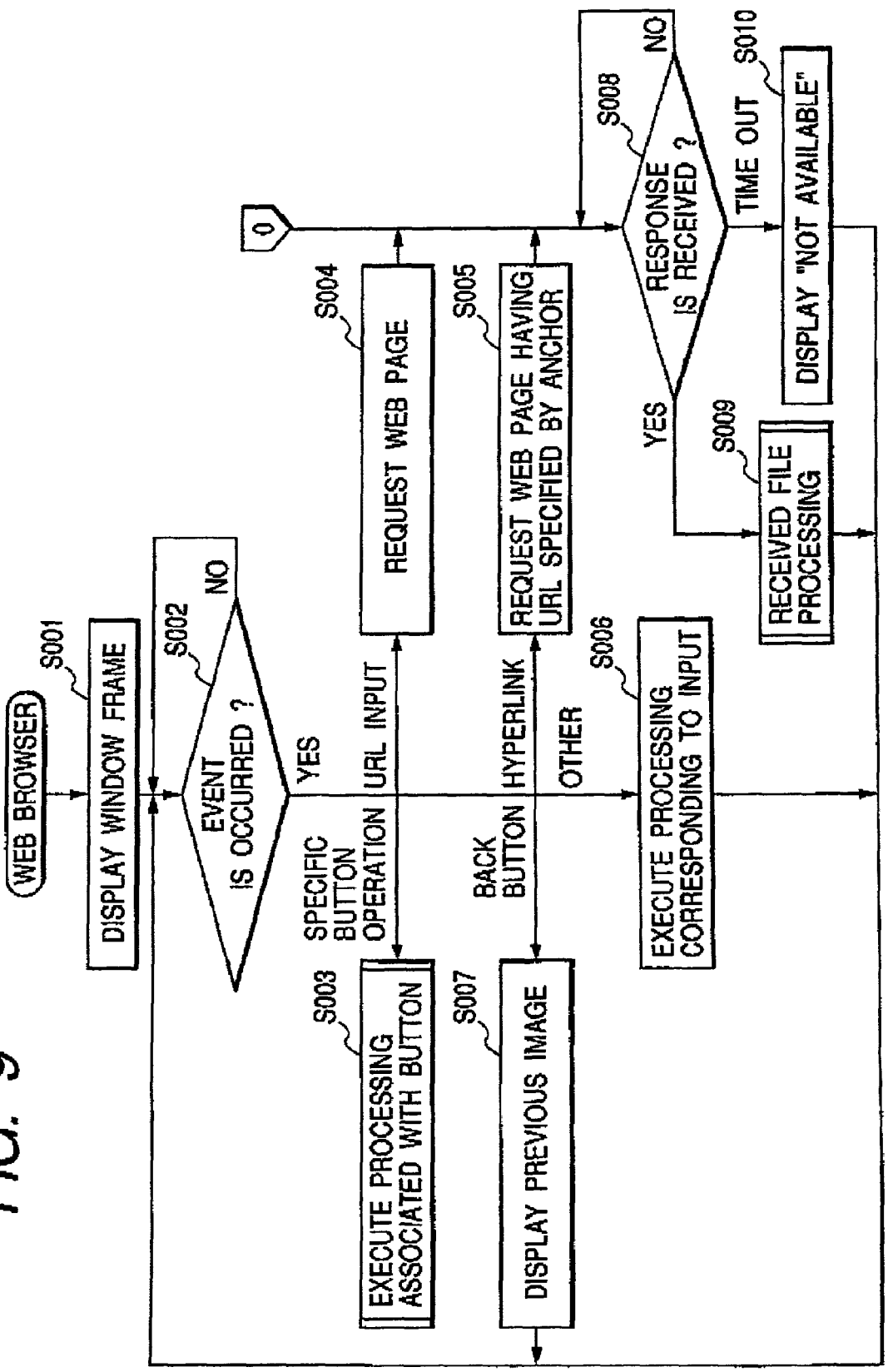
FIG. 9 is a flowchart to show the processing contents of a Web browser.

FIG. 9 is a flowchart to indicate the processing contents of the CPU 20 by the Web browser 27. However, the Web browser 27 is the generally commercially available browser program (browser program compatible with Java and supporting Active X) itself and no new functions are added thereto.

The Web browser 27 first displays a window containing a menu and a URL input field on the display 22 at S001 after being activated, and then executes loop processing at S002 to S010.

At S002 when the loop processing is effected, the Web browser 27 waits for any of various events to occur. The various events are user's entry through the input device 23, response reception from the Web server device, and the like. As examples of the user' entry, the user uses the mouse to move the cursor to any of various controls and clicks the mouse button (hereinafter expressed as "the user clicks on control") and the user enters any character through the keyboard. When any event occurs, the Web browser 27 executes processing corresponding to the type of event that occurred.

Specifically, if it is determined that a URL is entered, namely, if the user presses an ENTER key of the keyboard meaning "execute" in a state in which the character string corresponding to the URL is displayed in the URL input field on the tool bar of the window or if the user selects a previously registered URL out of the menu on the frame, the Web browser 27 transmits an HTTP request message containing the entered URL to the server device corresponding to the URL at S004. After completion of S004, the Web browser 27 advances the process to S008.

On the other hand, if the user performs hyperlink operation at S002, namely, if the user clicks on any object (button, URL, character string, etc.,) hyperlinked with any URL in the HTML for displaying the screen in the screen displayed in the window or if the user presses the ENTER key in a state in which the object hyperlinked with any URL has focus, the Web browser 27 transmits an HTTP request message containing the URL hyperlinked with the object to the server device corresponding to the URL at S005. After completion of S005, the Web browser 27 advances the process to S008.

At S008, the Web browser 27 waits for reception of a response message to the HTTP request message transmitted to any Web server device immediately before. If the Web browser 27 cannot receive the response message within a predetermined time limit, it displays a screen indicating that the page is unavailable in the window at S010 and then returns the process to S002. In contrast, if the Web browser 27 can receive the response message within the time limit, it advances the process to S009.

Figure 10:
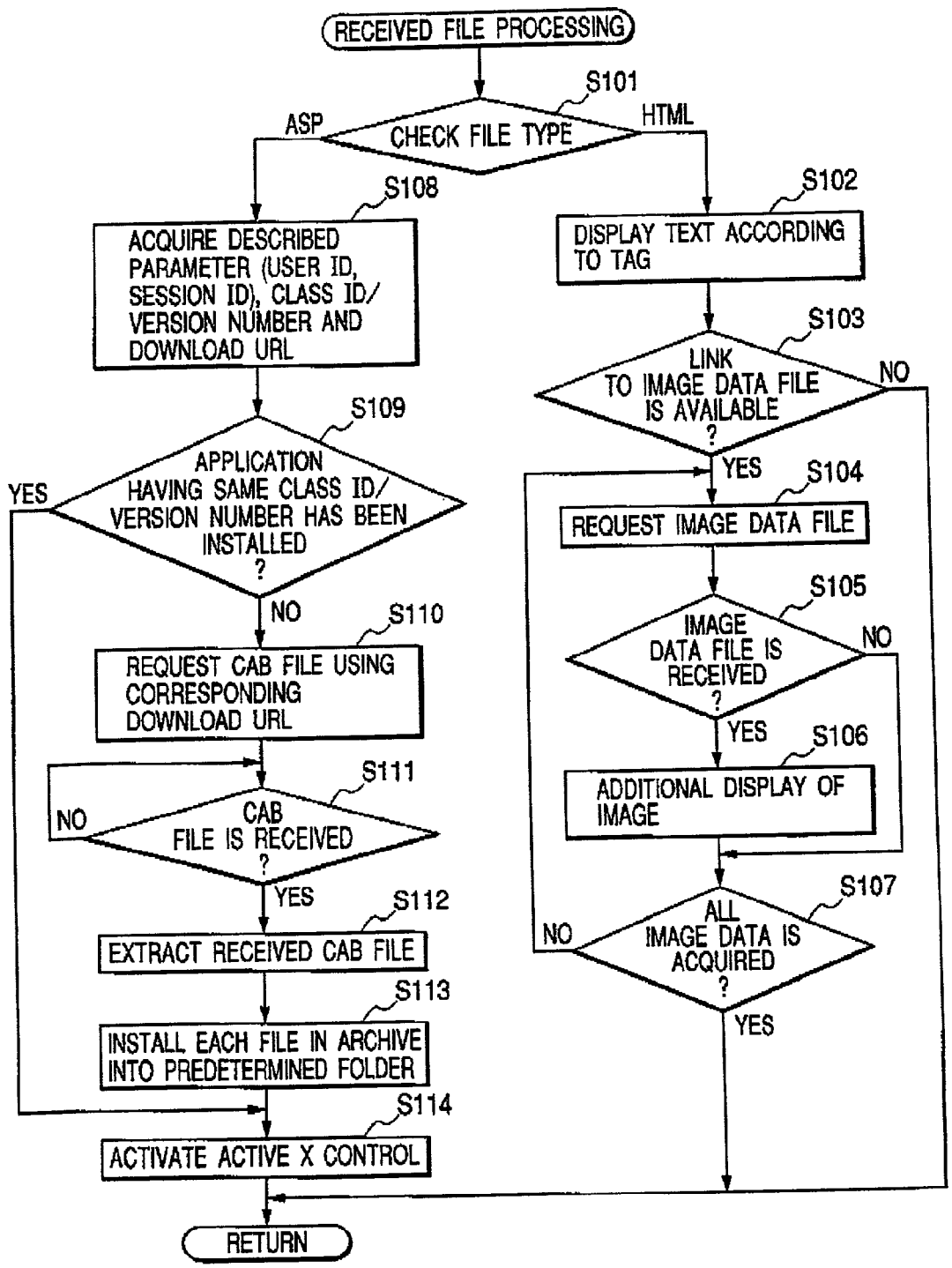
FIG. 10 is a flowchart to show a processing subroutine for a reception file in FIG. 9.

At S009, the Web browser 27 executes processing for the file contained in the received response message according to a subroutine shown in FIG. 10. At S101 when the subroutine is entered, the Web browser 27 checks whether the type of file contained in the received response message is an HTML file or an ASP file.

If the file type is an HTML file, the Web browser 27 displays the text portion of the HTML document in the HTML file in the window as specified by the attached tag at S102.

At S103 following S102, the Web browser 27 checks to see if the HTML document contains a tag specifying a link to an image data file (JPEG file, GIF file). If a tag specifying a link to an image data file is not contained, the Web browser 27 immediately terminates the subroutine and returns the process to the main routine in FIG. 9.

In contrast, if the HTML document contains a tag specifying a link to an image data file, at S104, the Web browser 27 specifies one tag specifying a link to an image data file and transmits an HTTP request as a request to send the image data file linked by the specified tag to the current Web server device (Web server device of the response message response source).

At S105 following S104, the Web browser 27 waits for reception of a response message to the HTTP request transmitted at S104 and if the Web browser 27 cannot receive the response message within a predetermined time limit, immediately it advances the process to S107. In contrast, if the Web browser 27 can receive the response message within the time limit, it inserts the image based on the image data file contained in the response message into the text displayed in the window for display at S106 and then advances the process to S107.

At S107, whether or not processing for links to all image data files contained in the HTML document has been performed is checked. If processing for all links is not yet complete, the process is returned to S104 and processing for the next link is executed. In contrast, if processing for links to all image data files is complete, the subroutine is terminated and the process is returned to the main routine in FIG. 9.

On the other hand, if the type of file contained in the received response message is an ASP file, at S108, the Web browser 27 reads the parameters (in image editor activating page ASP described later, user ID and session ID), the class ID, the version number, and the download URL described in the ASP file.

At S109 following S108, the Web browser 27 checks whether or not the application having the class ID and the version number read at S108 is already installed in the hard disk 25. If the application is already installed, the process is advanced to S114. In contrast, if the application having the class ID and the version number read at S108 is not yet installed in the hard disk 25, at S110, the Web browser 27 specifies the download URL read at S108 and transmits an HTTP request message as a request to send the CAB file (image editor CAB file 50) corresponding to the URL to the current Web server device.

At S111 following S110, the Web browser 27 waits for reception of the CAB file requested at S110. Upon reception of the CAB file, the Web browser 27 extracts the received CAB file at S112.

At S113 following S112, the Web browser 27 installs the files in the archive obtained by extracting the CAB file (if the file is the image editor CAB file 50, the image editor activating Active X 51, the image editor Java application 52, the decoding DLL 53, and the print OCX 54) in a predetermined folder in the hard disk 25. After completion of installing the files, the Web browser 27 advances the process to S114.

At S114, the Web browser 27 activates Active X installed at S113. After completion of S114, the Web browser 27 terminates the subroutine and returns the process to the main routine in FIG. 9.

In the main routine in FIG. 9, upon completion of S009, the process is returned to S002.

On the other hand, if the user clicks on a BACK button at S002, the Web browser 27 again displays the screen immediately preceding the current screen in the window at S007 and then returns the process to S002.

On the other hand, if the user performs any other operation (except the case where the user clicks on a specific button described later) at S002, the Web browser 27 executes processing corresponding to the operation contents at S006. For example, if the user performs operation to move the focus, namely, clicks on a predetermined control (text box, combo box, etc.,) in the screen, the Web browser 27 stores that the clicked control newly has the focus, and changes the display mode to the mode indicating that the control has the focus. For example, if any text box has the focus, a character input cursor is displayed in the text box. At the same time, the Web browser 27 changes the display mode of the former control having the focus to the display mode indicating that the control has no focus. When a character is entered, if the focus exists in any text box at the point in time, the Web browser 27 writes the entered character (in conversion form by a character conversion program not shown) into the character input cursor position in the text box having the focus. If the Web browser 27 determines that the user operates a check box or a radio button, the Web browser 27 switches the display mode (setup value) of the check box or the radio button from on to off or from off to on. After completion of S006, the Web browser 27 returns the process to S002 and waits for anther event to occur.

On the other hand, if the user clicks on a specific button (a button for which execution of data transmission is defined by a tag, such as a REGISTER button, a TRANSMIT button, or a PRINT button in the screen), the Web browser 27 executes processing set in the operated button at S003.

Next, the processing contents of the Web server 35 will be discussed together with files transmitted to the Web browser 27 by the Web server 35, screens displayed by the transmitted files, the processing contents of the Web browser 27 at S003 defined for the specific buttons in the screen, and the session ID management table 48 and the membership database 44.

Figure 14:
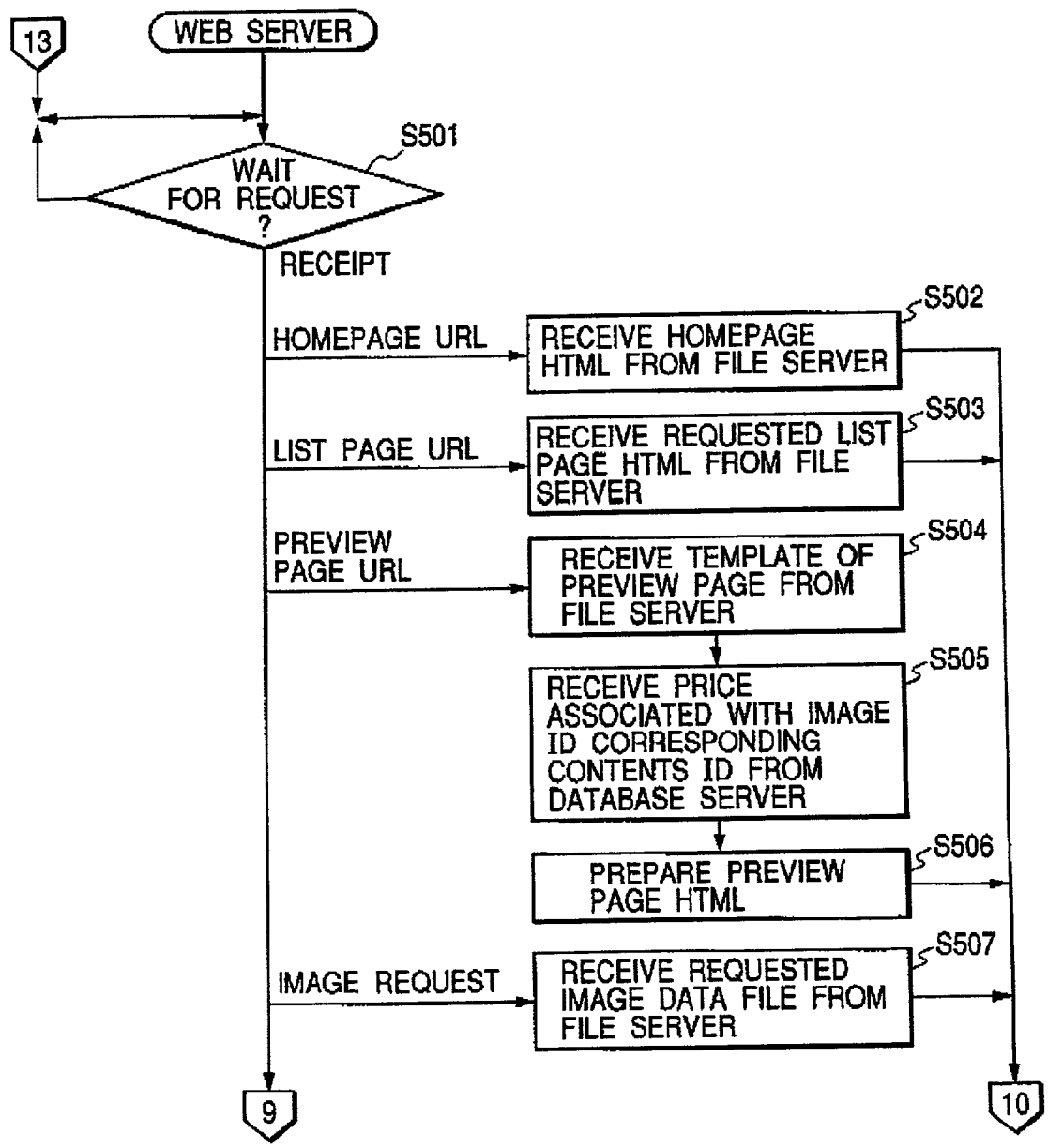
FIGS. 14 to 16 are flowcharts to show processing of a Web server device.
Figure 15:
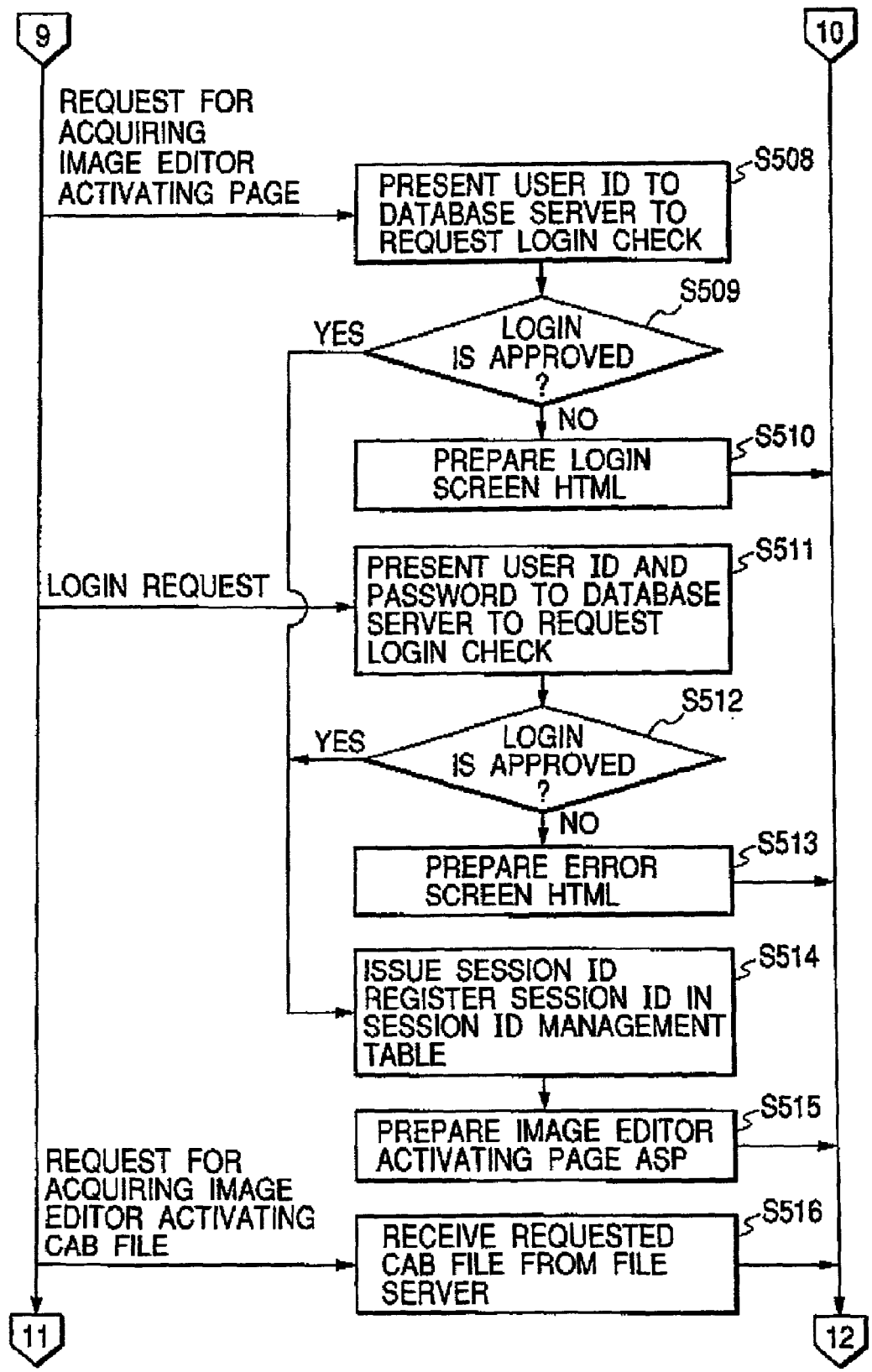
Figure 16:
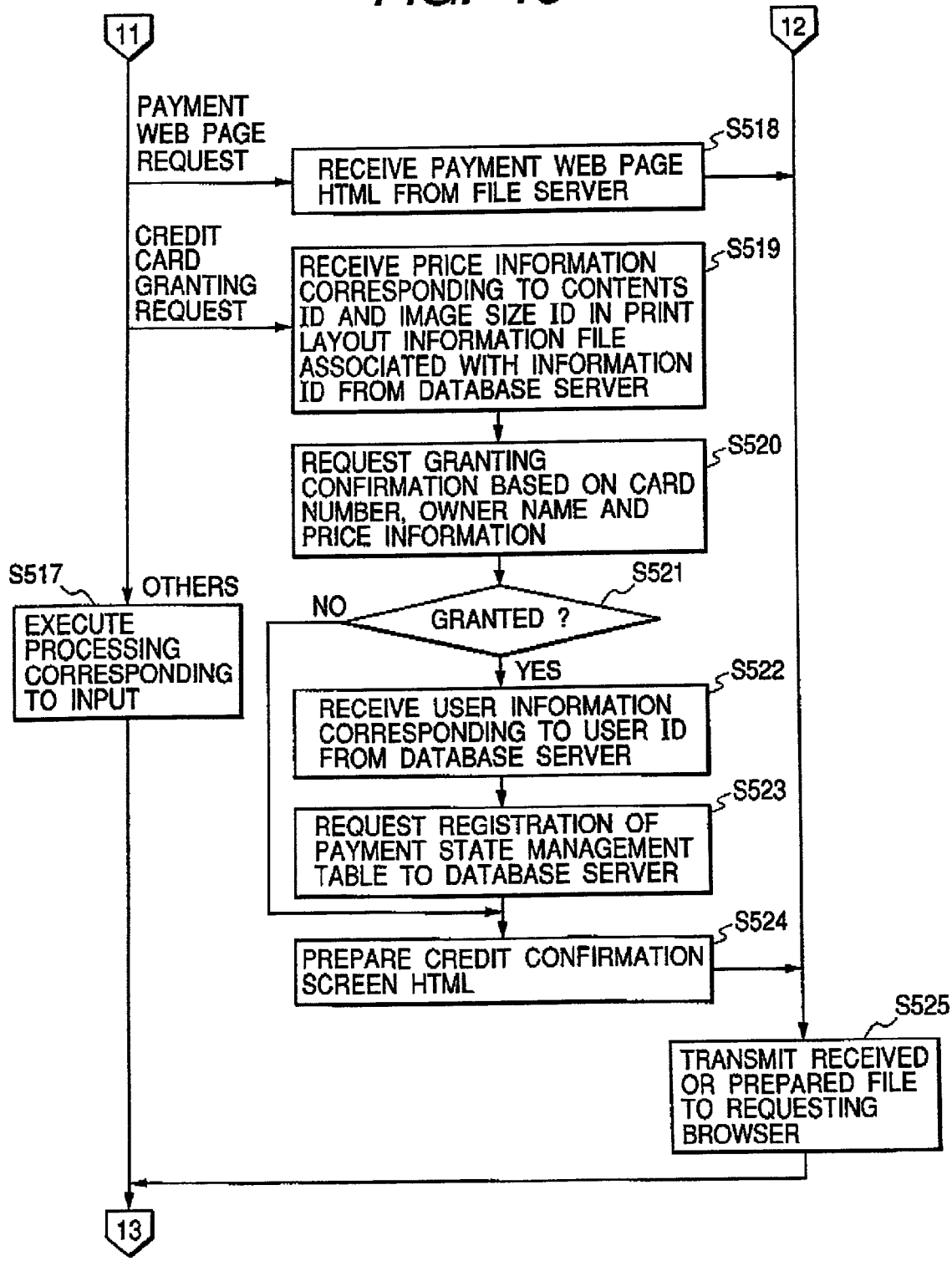

FIGS. 14 to 16 are flowcharts to show the processing contents of the Web server 35. At S501 after activation, the Web server 35 waits for reception of an HTTP request message from the Web browser 27 executed in any user terminal 2. Upon reception of an HTTP request message, the Web server 35 executes processing responsive to the contents of the HTTP request message.

Figure 32:
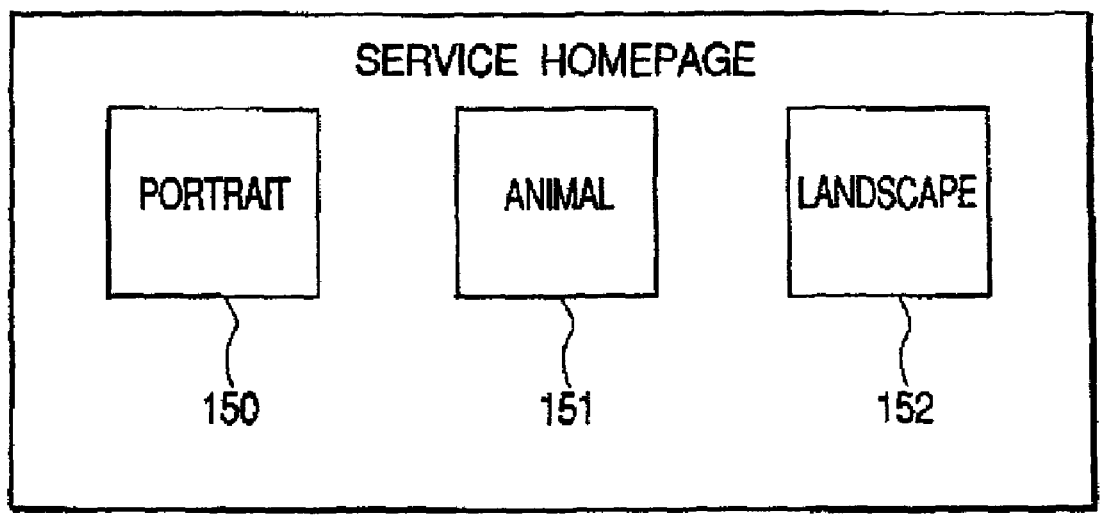
FIG. 32 is a drawing to show a service homepage example.

Specifically, if the received HTTP request message contains the URL of the service homepage, the Web server 35 advances the process from S501 to S502, receives the HTML file 40 of the service homepage from the file server 37, replies a response message storing the HTML file 40 to the requesting Web browser 27 at S525, and returns the process to S501. FIG. 32 shows a screen (service homepage screen) displayed at the user terminal 2 based on the HTML file 40 of the service homepage. In buttons contained in the homepage screen (a PORTRAIT button 150, an ANIMAL button 151, and a LANDSCAPE button 152), hyperlinks to the corresponding list pages are set. Therefore, if the user clicks on the LANDSCAPE button 152 at the user terminal 2, the Web browser 27 transmits an HTTP request message containing the URL of the LANDSCAPE list page to the Web server 35 (S005).

Figure 33:
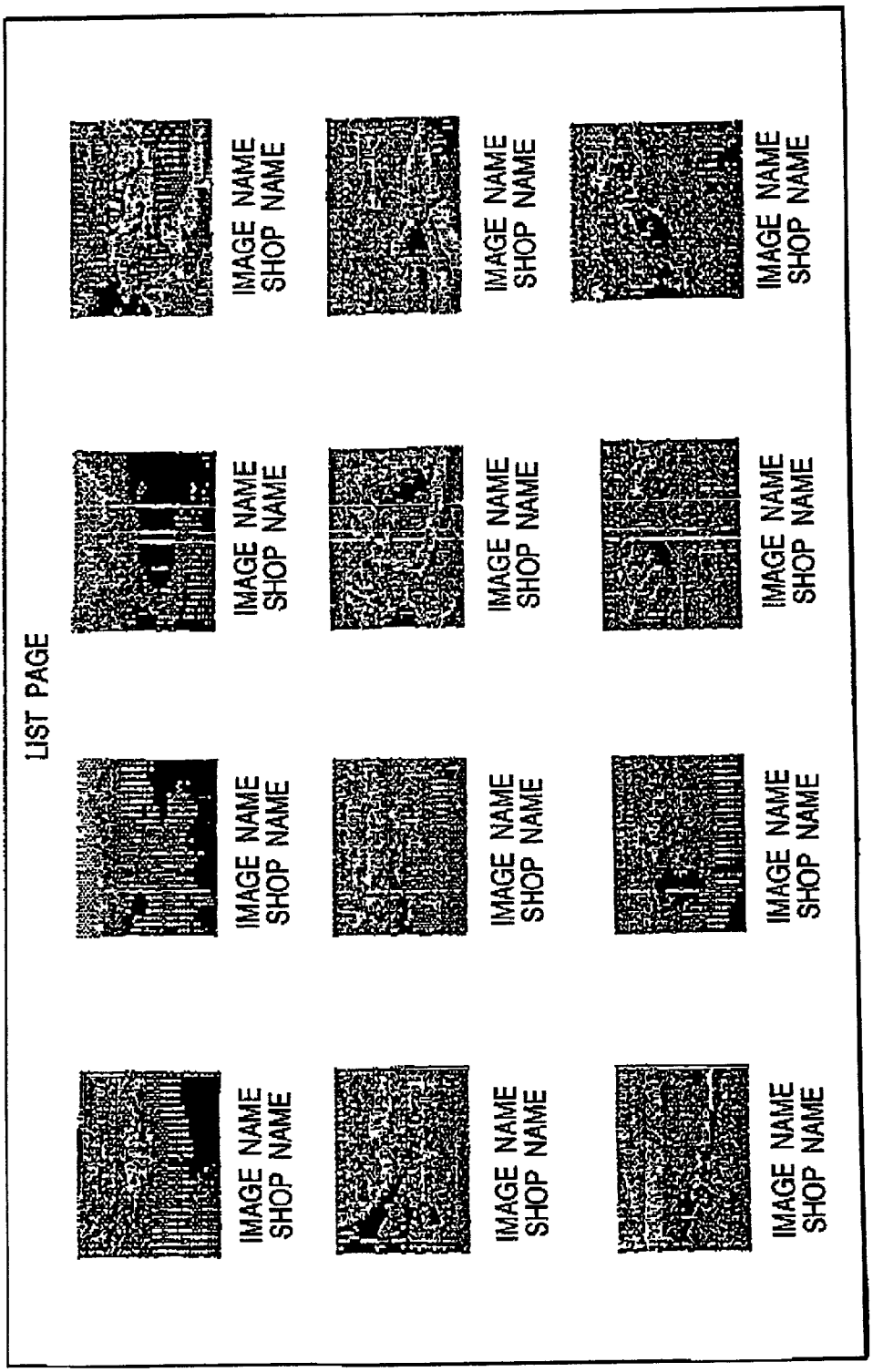
FIG. 33 is a drawing to show a list page example.

If the received HTTP request message contains the URL of any list page, the Web server 35 advances the process from S501 to S503, receives the HTML file 40 of the list page corresponding to the URL from the file server 37, replies a response message storing the HTML file 40 to the requesting Web browser 27 at S525, and returns the process to S501. FIG. 33 shows a screen (LANDSCAPE list page screen) displayed finally at the user terminal 2 based on the HTML file 40 of the homepage. In each list page, links to the thumbnail images indicating the digital contents classified into the category of the list page (portrait, animal, or landscape) are set as hyperlinks. Therefore, the Web browser 27 in the user terminal 2 transmits an HTTP request message containing the URL of each thumbnail image to the Web server 35 (S104).

If the received HTTP request message contains the URL of a thumbnail image, the Web server 35 advances the process from S501 to S507, receives the image data file 41 of the thumbnail image corresponding to the URL from the file server 37, replies a response message storing the image data file 41 to the requesting Web browser 27 at S525, and returns the process to S501. Consequently, finally the list screen is displayed at the user terminal 2 as shown in FIG. 33. If the user selects any image as the object to be purchased and clicks on the corresponding thumbnail image in the list screen, the Web browser 27 transmits an HTTP request message containing the URL of the preview page set as a hyperlink in the thumbnail image (the contents ID of the target image indicated by the thumbnail image is built in the URL) to the Web server 35 (S005).

Figure 34:
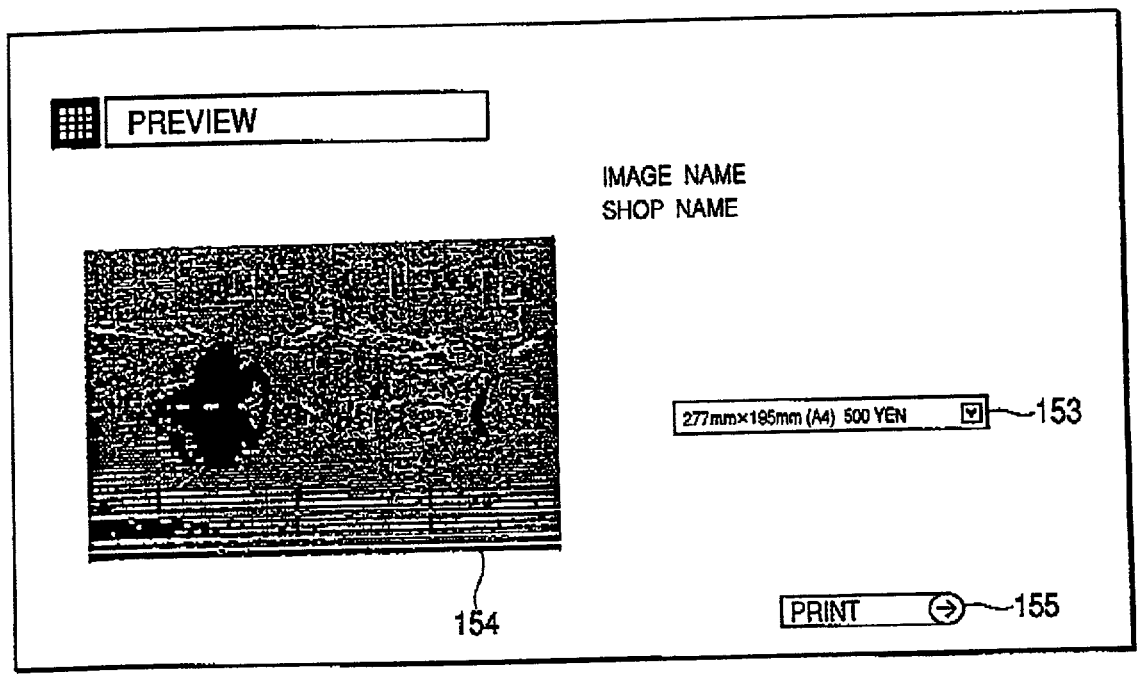
FIG. 34 is a drawing to show a preview page example.

If the received HTTP request message contains the URL of any preview page, the Web server 35 advances the process from S501 to S504. At S504, the Web server 35 receives the template of the HTML file of the preview page from the file server device 42. At S505 following S504, the Web server 35 extracts the contents ID of the image to be purchased, built in the URL of the preview page and receives the price for each image size ID related to the contents ID in the contents database 43 from the database server 38. At S506 following S505, the Web server 35 creates the HTML file of the preview page for the image to be purchased. Specifically, the HTML file 40 received at S504 is opened, a tag setting the file name (containing the contents ID) of the preview image of the image to be purchased (image a little larger than the thumbnail image) in an anchor is added, and the price of each image size received at S505 is set in each combo box 153. Upon completion of creating the HTML file of the preview page for the image to be purchased, the Web server 35 returns the preview page HTML file to the requesting Web browser 27 at S525 and returns the process to S501. Upon reception of the preview page HTML file, the Web browser 27 in the user terminal 2 requests the Web server 35 to send the image data file 41 of the preview image of the image to be purchased (S104, S507) in a similar manner to that described above and finally displays a preview page as shown in FIG. 34. The preview page contains a PRINT button 155 in addition to the preview image 154 of the image to be purchased and the combo box 153 described above.

Figure 11:
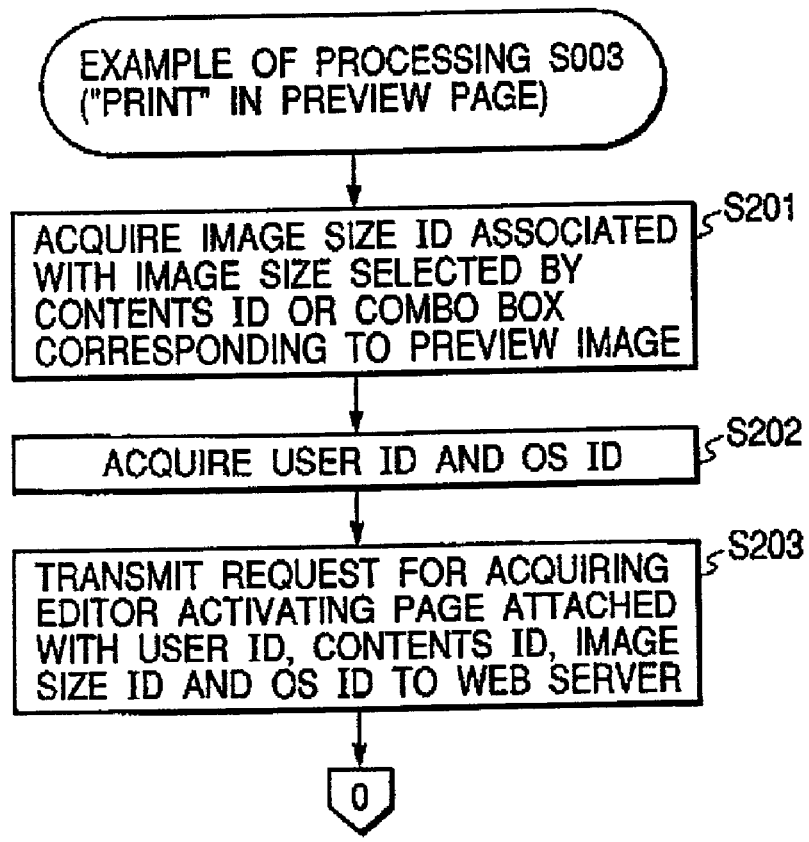
FIG. 11 is a flowchart to show processing executed when the user clicks on a PRINT button on a preview page.

On the preview page, the user opens the combo box 153 and selects any image size and then clicks on the PRINT button 155. Execution of processing shown in FIG. 11 by the Web browser 27 at S003 in FIG. 9 when the user clicks on the PRINT button 155 is set in the tag assigned to the PRINT button 155 in the HTML file of the preview page. Here, the processing shown in FIG. 11 will be discussed. At S201, the Web browser 27 acquires the contents ID contained in the file name of the preview image and the image size ID corresponding to the image size selected in the combo box 153. At S202 following S201, the Web browser 27 acquires the user ID stored in the RAM 24 and the OS ID corresponding to the operating system 26. At S203 following S202, the Web browser 27 transmits an HTTP request message of an image editor acquisition request specifying the contents ID and the image size ID acquired at S201 and the user ID and the OS ID acquired at S202 to the Web server 35. Upon completion of S203, the Web browser 27 advances the process to S008 and waits for a response message to the HTTP request message transmitted at S203.

Figure 35:
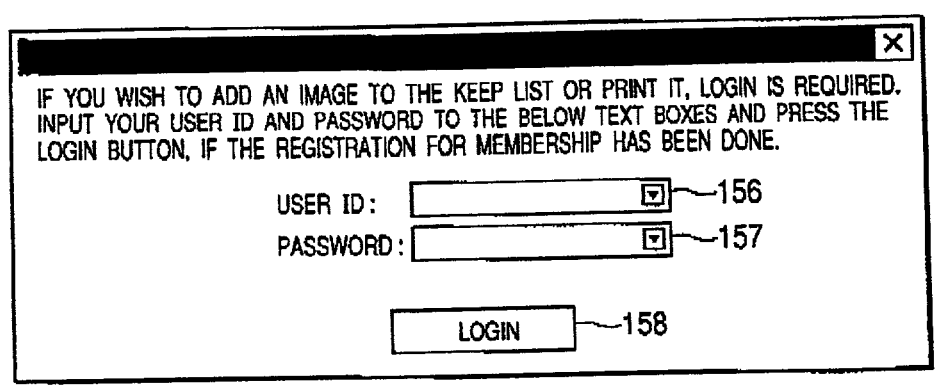
FIG. 35 is a drawing to show a login page example.

Referring again to FIGS. 14 to 16, if the received HTTP request message contains an image editor activating page acquisition request, the Web server 35 advances the process from S501 to S508, extracts the user ID specified in the image editor activating page acquisition request, and requests the database server 38 to check whether or not the user corresponding to the user ID is logging in. Upon reception of the login check request, the database server 38 extracts the login information in the entry containing the specified user ID from the membership database 44 and returns the login information to the Web server 35. At S509, the Web server 35 checks whether or not the corresponding user is logging in based on the returned information. If the user is logging in, the process is advanced to S514. In contrast, if the user is not logging in, the Web server 35 receives the HTML file 40 of the login screen from the file server 37 at S510, replies a response message storing the HTML file 40 to the requesting Web browser 27, and returns the process to S501. FIG. 35 shows a login screen displayed at the user terminal 2 based on the HTML file 40 of the login screen. The login screen contains a LOGIN button 158 as well as a user ID text box 156 and a password text box 157.

Figure 12:
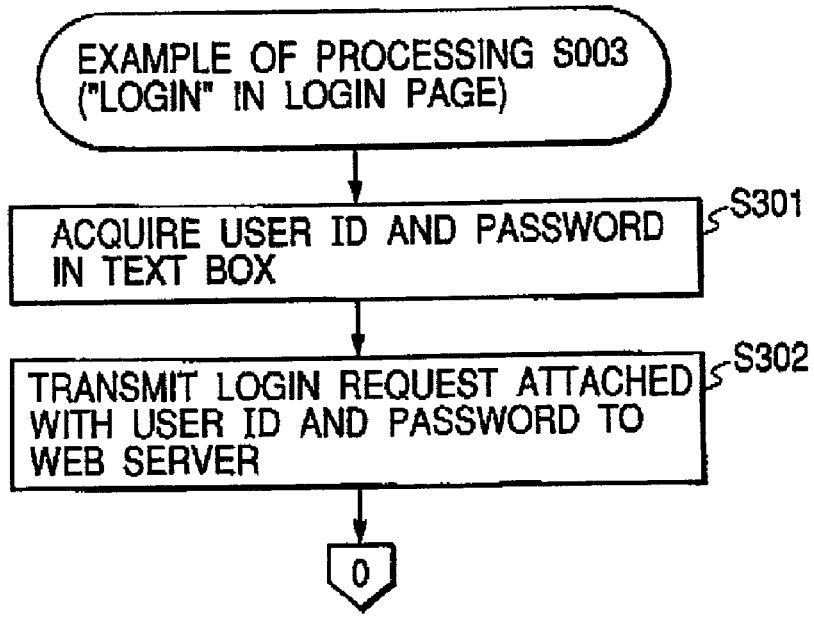
FIG. 12 is a flowchart to show processing executed when the user clicks on a LOGIN button on a login page.

On the login screen, the user writes his or her user ID into the user ID text box 156 and writes his or her password into the password text box 157 and then clicks on the LOGIN button 158. Execution of processing shown in FIG. 12 by the Web browser 27 at S003 in FIG. 9 when the user clicks on the LOGIN button 158 is set in the tag assigned to the LOGIN button 158 in the HTML file of the login screen. Here, the processing shown in FIG. 12 will be discussed. At S301, the Web browser 27 acquires the user ID inputted in the user ID text box 156 and the password inputted in the password text box 157. At S302 following S301, the Web server 35 transmits an HTTP request message of a login request specifying the user ID and the password acquired at S301 to the Web server 35. Upon completion of S302, the Web browser 27 advances the process to S008 and waits for a response message to the HTTP request message transmitted at S302.

Referring again to FIGS. 14 to 16, if the received HTTP request message contains a login request, the Web server 35 advances the process from S501 to S511, extracts the user ID and the password contained in the HTTP request message, and requests the database server 38 to check whether or not the user corresponding to the user ID and the password is allowed to log in. Upon reception of the login check request, the database server 38 retrieves an entry containing the combination of the specified user ID and password in the membership database 44. If the entry containing the combination of the specified user ID and password exists in the membership database 44, the database server 38 sets the login information in the entry to "now login" and returns login OK to the Web server 35. In contrast, if the entry containing the combination of the specified user ID and password does not exist in the membership database 44, the database server 38 returns login NG to the Web server 35. The Web server 35 checks the contents of the reply from the database server 38 at S512 and if the reply is login OK, the Web server 35 advances the process to S514. In contrast, if the reply is login NG, the Web server 35 receives the HTML file 40 of an error screen from the file server 37 at S513, replies a response message storing the HTML file 40 to the requesting Web browser 27 at S525, and returns the process to S501.

At S514, the Web server 35 issues a session ID to uniquely identify connection to the corresponding user terminal. The Web server 35 also extracts the user ID, the contents ID, the image size ID, and the OS ID specified in the image editor activating page acquisition request. The Web server 35 registers a combination of the session ID, the user ID, the contents ID, the image size ID, and the OS ID in the session ID management table 48 in the RAM 11. As shown in FIG. 5, a plurality of combinations of the IDs can be registered in the session ID management table 48.

At S515 following S514, the Web server 35 creates an image editor activating page ASP file. Written into the image editor activating page ASP file are the URL indicating the storage location of the image editor CAB file 50 (download URL), the class ID and the version ID to identify the image editor Java application 52 in the image editor CAB file 50, the session ID issued at S514, and the user ID extracted at S514. The Web server 35 replies a response message storing the image editor activating page ASP file to the requesting Web browser 27 at S525, and returns the process to S501.

Upon reception of the image editor activating page ASP file, the Web browser 27 reads the user ID, the session ID, the class ID, the version number, and the download URL described in the image editor activating page ASP file. As described above, if the image editor Java application 52 having the same session ID and the same class ID is installed on the hard disk 25, the image editor activating Active X to start the image editor Java application 52 is activated (S114). In contrast, if the image editor Java application 52 having the class ID and the version number described in the image editor activating page ASP file is not installed on the hard disk 25, an HTTP request message of an image editor activating CAB file request specifying the download URL described in the image editor activating page ASP file is transmitted to the Web server 35 (S110).

Referring again to FIGS. 14 to 16, if the received HTTP request message contains an image editor activating CAB file request, the Web server 35 advances the process from S501 to S516, receives the image editor activating CAB file 50 corresponding to the URL contained in the HTTP request message from the file server 37, replies a response message storing the image editor activating CAB file 50 to the requesting Web browser 27 at S525, and returns the process to S501.

Upon reception of the image editor activating CAB file 50, the Web browser 27 extracts the image editor activating CAB file 50 (S112), installs the image editor activating Active X 51, the image editor Java application 52, the decoding DLL 53, and the print OCX 54 contained in the archive in a predetermined location in the hard disk 25 (S113), specifies the user ID and the session ID, and activates the image editor activating Active X 51, as described above.

Figure 38:
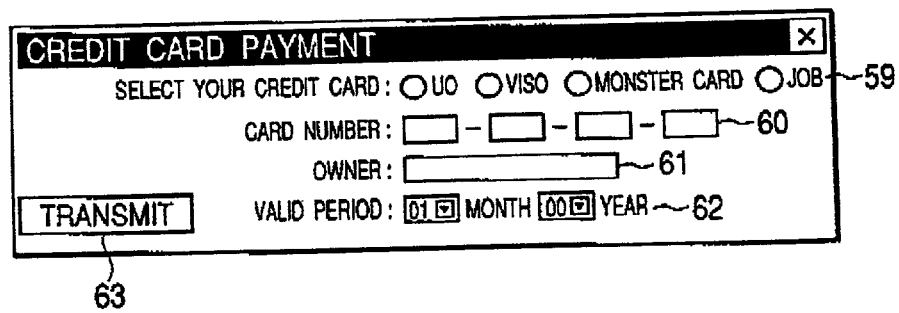
FIG. 38 is a drawing to show a payment page example.

On the other hand, if the received HTTP request message contains the URL of a payment Web page, the Web server 35 advances the process from S501 to S518, receives the HTML file 40 of the payment Web page from the file server 37, replies a response message storing the HTML file 40 to the requesting Web browser 27 at S525, and returns the process to S501. FIG. 38 shows a screen displayed at the user terminal 2 based on the HTML file 40 of the payment Web page (payment Web page screen). As shown in FIG. 38, the payment Web page screen contains an option button 59 for selecting the credit card type (credit card company name issuing the credit card), a card number text box 60 for entering the card number, a holder text box 61 for entering the holder, a date combo box 62 for entering the valid period, and a transmit button 63.

Figure 13:
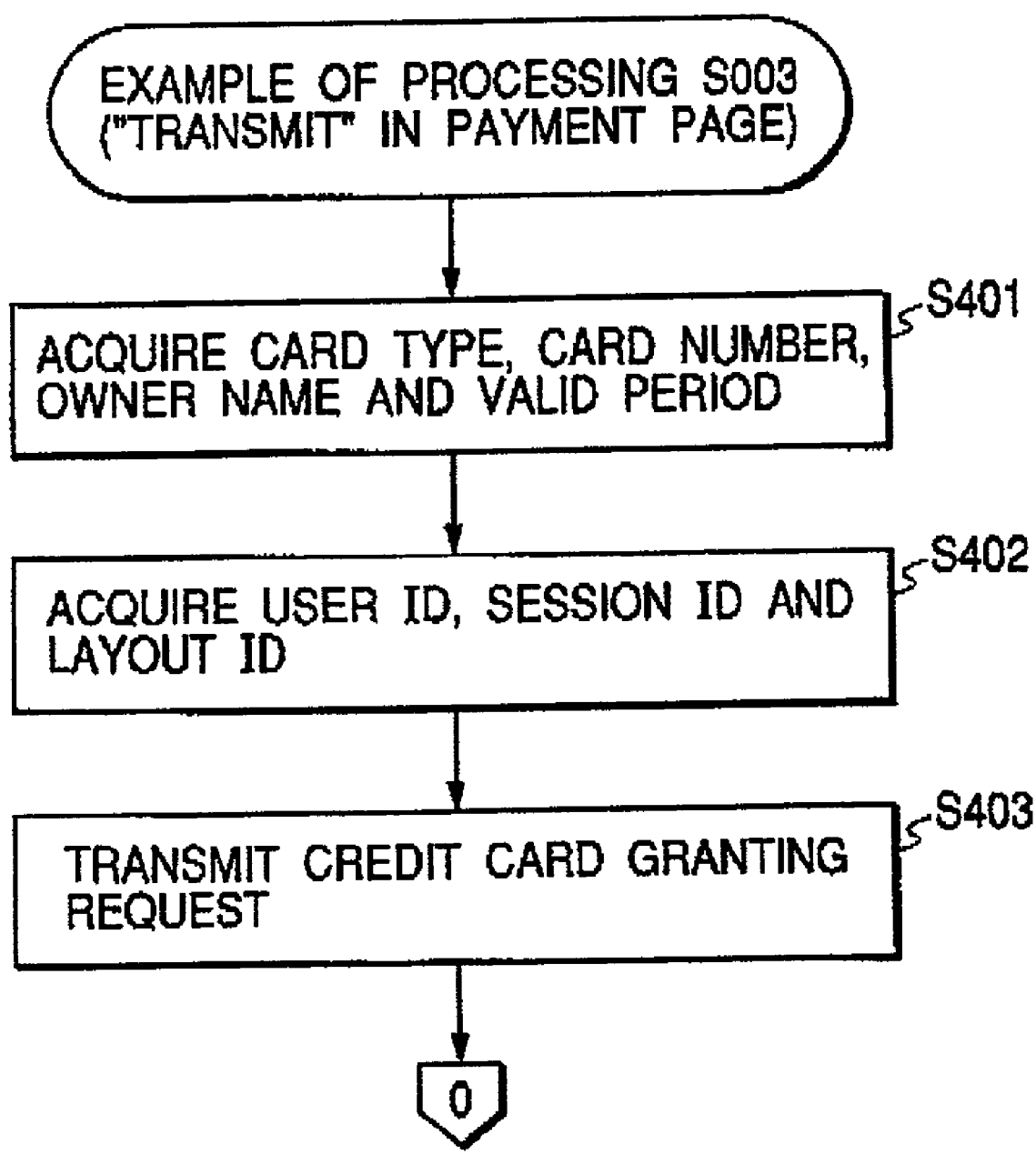
FIG. 13 is a flowchart to show processing executed when the user clicks on a TRANSMIT button on a payment page.

On the payment Web page, the user clicks on the option button 59 corresponding to his or her own credit card type (credit card company name issuing the credit card), writes the card number of the credit card into the card number text box 60, writes his or her name into the holder text box 61, and sets the valid period of the credit card in the valid period combo box 62 and then clicks on the TRANSMIT button 63. Execution of processing shown in FIG. 13 by the Web browser 27 at S003 in FIG. 9 when the user clicks on the TRANSMIT button 63 is set in the tag assigned to the TRANSMIT button 63 in the HTML file of the payment Web page. Here, the processing shown in FIG. 13 will be discussed. At S401, the Web browser 27 acquires the card type (credit card company name issuing the card) selected with the option button 59 in the payment Web page screen, the card number written into the card number text box 60, the owner name written into the owner name text box 61, and the valid period set in the valid period combo box 62 (information for credit confirmation). At S402 following S401, the Web browser 27 acquires the user ID stored in the RAM 24, the OS ID corresponding to the operating system 26, and the layout ID described later stored in the RAM 24. At S403 following S402, the Web browser 27 transmits an HTTP request message of a credit card granting request specifying the card type (credit card company name issuing the card), the card number, the owner name, and the valid period acquired at S401 and the user ID, the session ID, and the layout ID acquired at S402 to the Web server 35. Upon completion of S403, the Web browser 27 advances the process to S008 and waits for a response message to the HTTP request message transmitted at S403.

Figure 28:
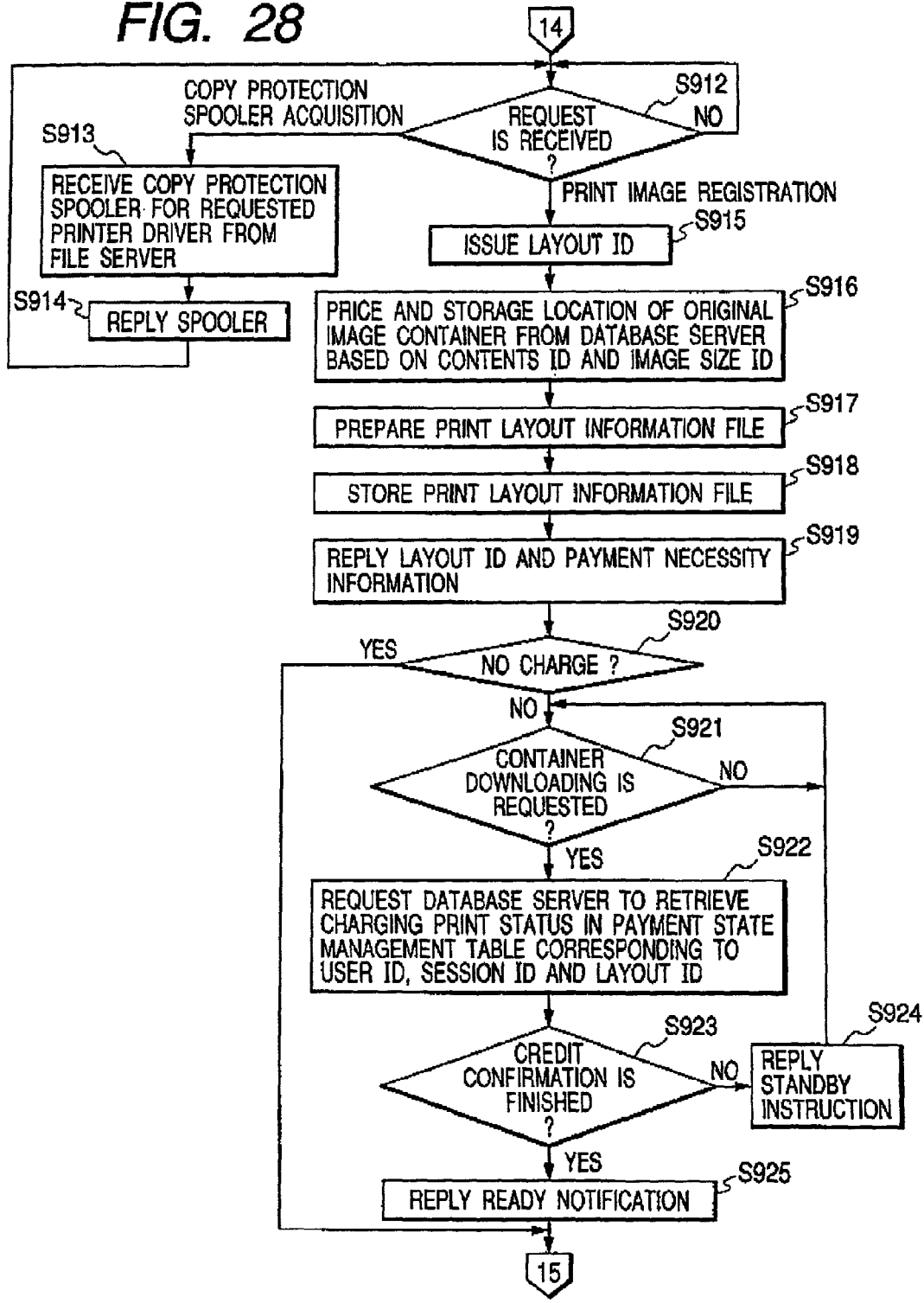
Figure 29:
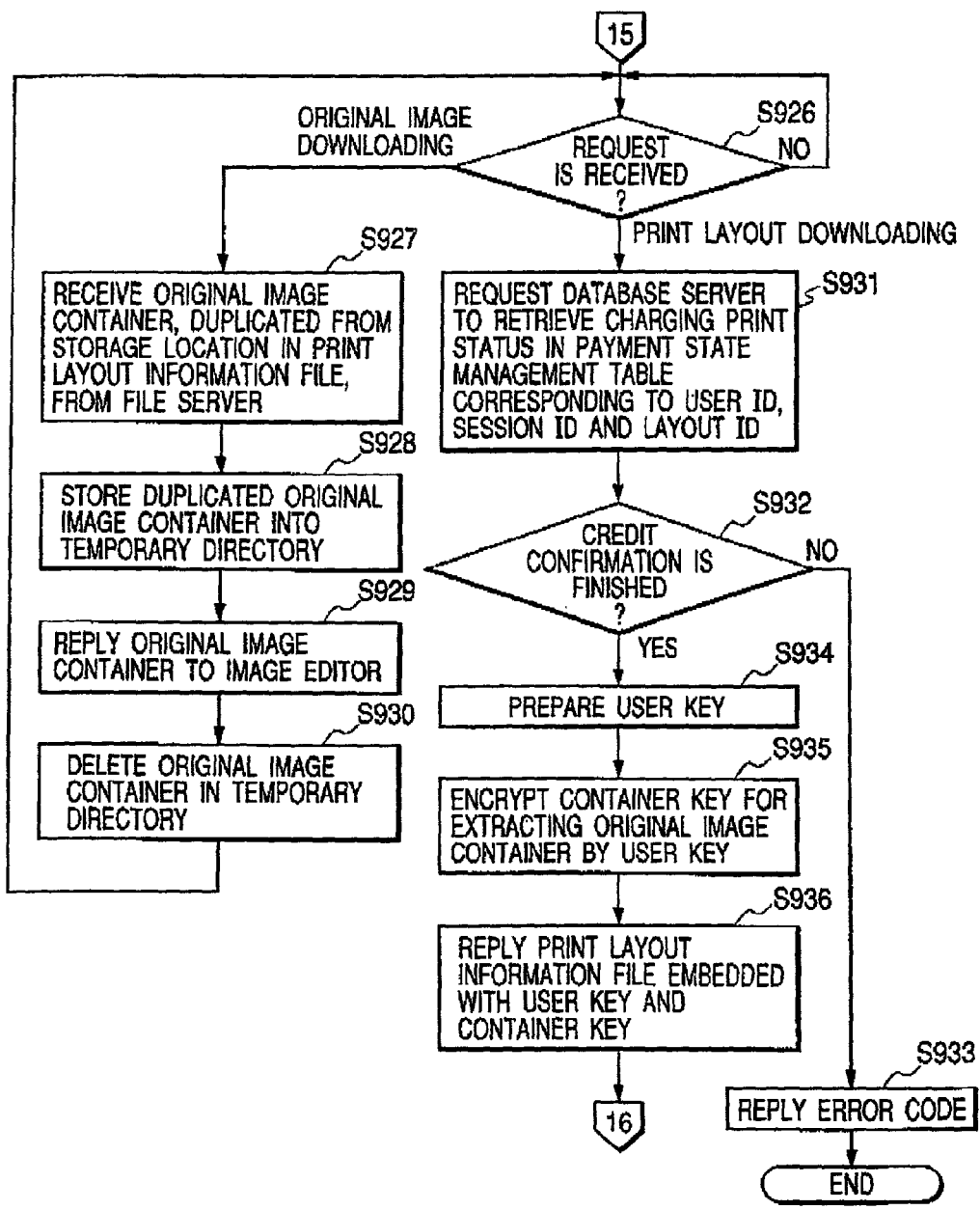
Figure 30:
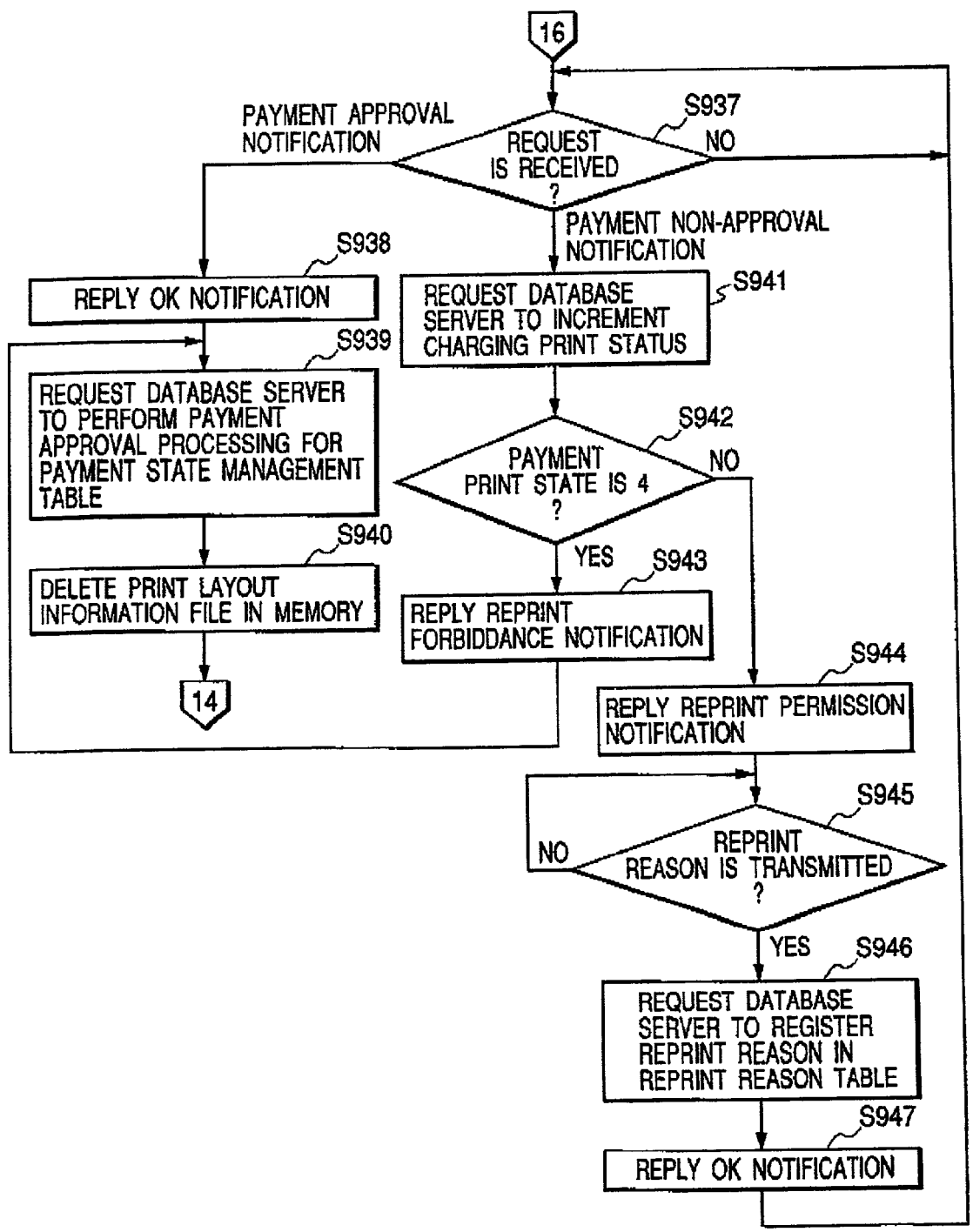

Referring again to FIGS. 14 to 16, if the received HTTP request message contains a credit card granting request, the Web server 35 advances the process from S501 to S519 and reads the print layout information file 49 stored in the RAM 11. The print layout information file 49 is data stored in the RAM 11 by the editor server 36 at S918 in FIG. 28 as described later and has the contents specifying the breakdown of the purchase (layout ID, layout information which is arrangement information of the image to be purchased and character string on the printed matter, user ID, session ID, and original image container storage location) for each purchase of printed matter about the image to be purchased. The layout ID is identification information to uniquely identify each printed matter purchase in the print layout information file 49. The Web server 35 extracts the entry containing the layout ID specified in the credit card granting request from the read print layout information file 49 and receives the price corresponding to the combination of the contents ID and the image size ID in the entry from the database server 38.

At S520 following S519, the Web server 35 specifies the card number and the owner name specified in the credit card granting request and the price acquired in S519 and sends a granting request to the credit server 3. That is, the Web server 35 requests the credit server 3 to check that the credit card indicated by the credit number is valid, that the holder of the credit card indicated by the card number is the user, and that the price is within the available payment limit (processing to check credit as to whether or not the credit card is valid).

At S521 following S520, the Web server 35 checks the granting result from the credit server 3. If the granting result is NG, the Web server 35 receives the HTML file 40 of a credit check screen indicating that the granting result is NG from the file server 37 at S524, replies a response message storing the HTML file 40 to the requesting Web browser 27 at S525, and returns the process to S501.

In contrast, if the granting result is OK, at S522, the Web server 35 receives the user information (address, name, age, and electronic mail address) corresponding to the user ID specified in the credit card granting request from the database server 38. At S523 following S522, the Web server 35 requests the database server 38 to register the combination of the user ID, the layout ID, the card type, the card number, and the valid period specified in the credit card granting request, the price acquired at S519, the user information acquired at S522, the processing date (issuance date), sale check flag="0," and charging print status="1" in an empty entry of the payment state management table 46. The Web server 35 receives the HTML file 40 of credit check screen indicating that the granting result is OK from the file server 37 at S524, replies a response message storing the HTML file 40 to the requesting Web browser 27 at S525, and returns the process to S501.

If the received HTTP request message contains any other request, the Web server 35 advances the process from S501 to S517, executes processing responsive to the request contents of the HTTP request message, and returns the process to S501.

Figure 17:
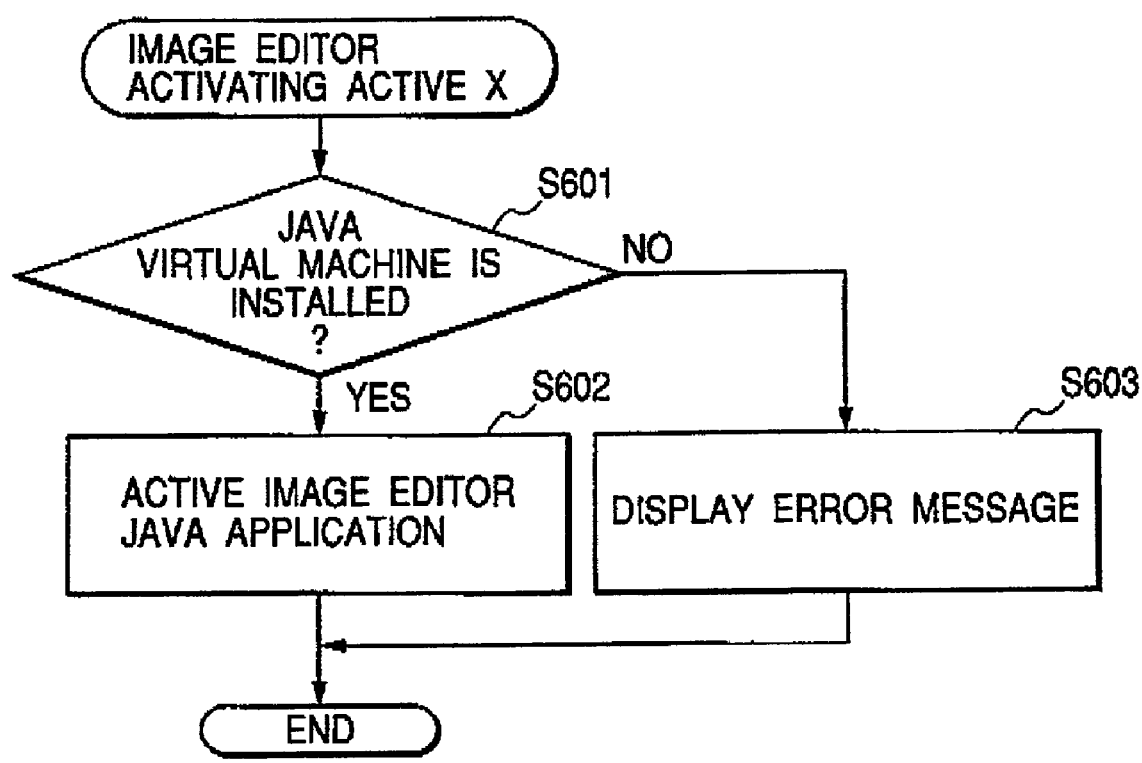
FIG. 17 is a flowchart to show processing of Active X.

Next, the processing contents of the image editor activating Active X activated as the Web browser 27 reading the image editor CAB file 50 executes S114 in FIG. 10 will be discussed with reference to FIG. 17.

At S601 after activation, the image editor activating Active X 51 checks whether or not the Java virtual machine 28 is installed on the hard disk 25. If the Java virtual machine 28 is not installed, the image editor activating Active X 51 displays an error message on the display 22 at S603 and then terminates the process.

In contrast, if the Java virtual machine 28 is installed on the hard disk 25, the image editor activating Active X 51 causes the Java virtual machine 28 to start processing following the image editor Java application 52 (client program). Hereinafter, the function that the Java virtual machine 28 causes the CPU 20 to execute following the image editor Java application 52 will be referred to as the image editor 52. The user ID and the session ID are inherited from the image editor activating Active X 51 to the image editor 52.

The processing contents of the image editor 52 activated by the image editor activating Active X 51 and the processing contents of the editor server 36 executed in synchronization by communicating with the image editor 52 will be discussed in time sequence. FIGS. 18 to 24 are flowcharts to show the main routine of processing performed by the image editor 52, and FIGS. 27 to 30 are flowcharts to show processing performed by the editor server 36.

Figure 18:
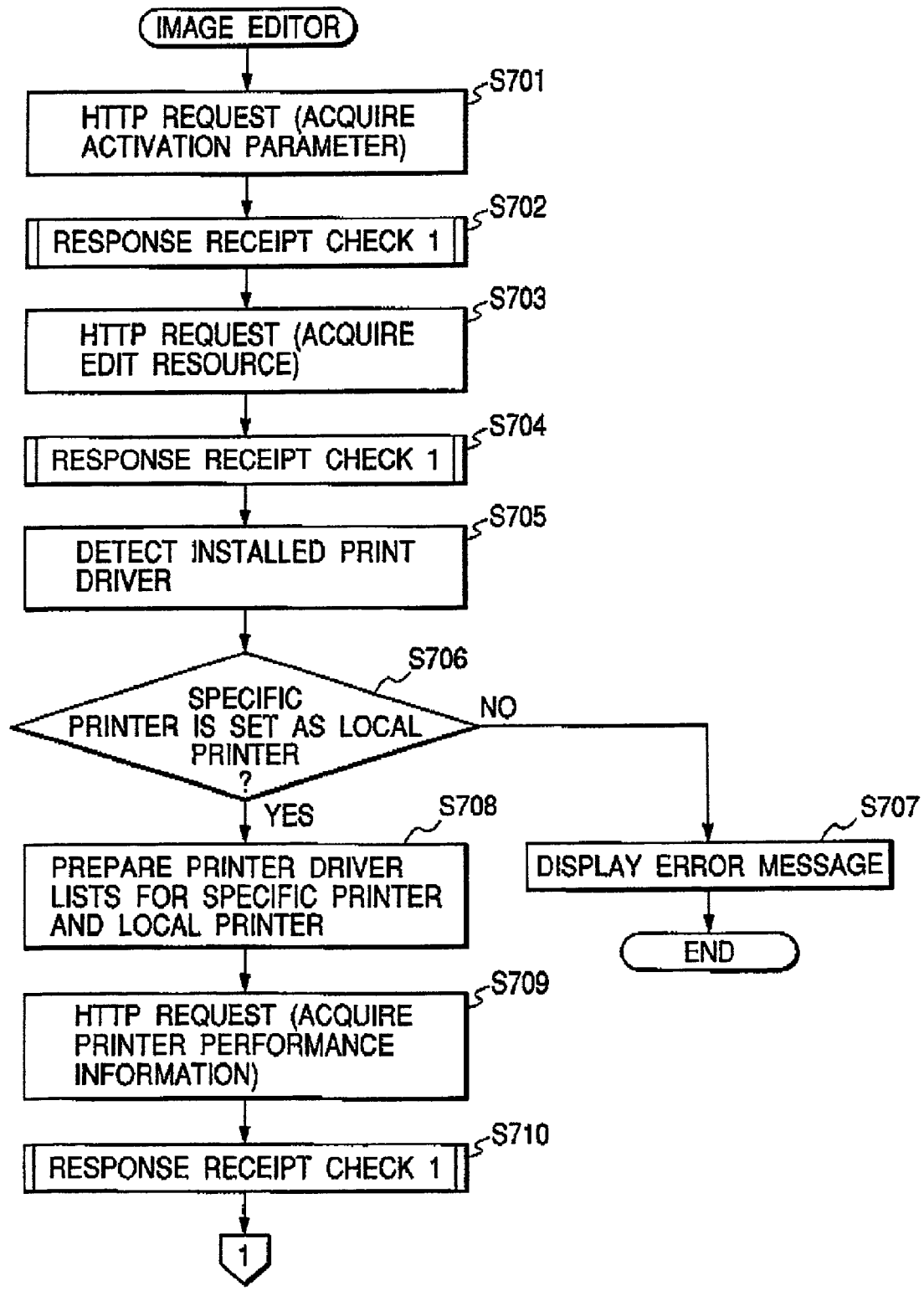
FIGS. 18 to 24 are flowcharts to show processing of an image editor.
Figure 19:
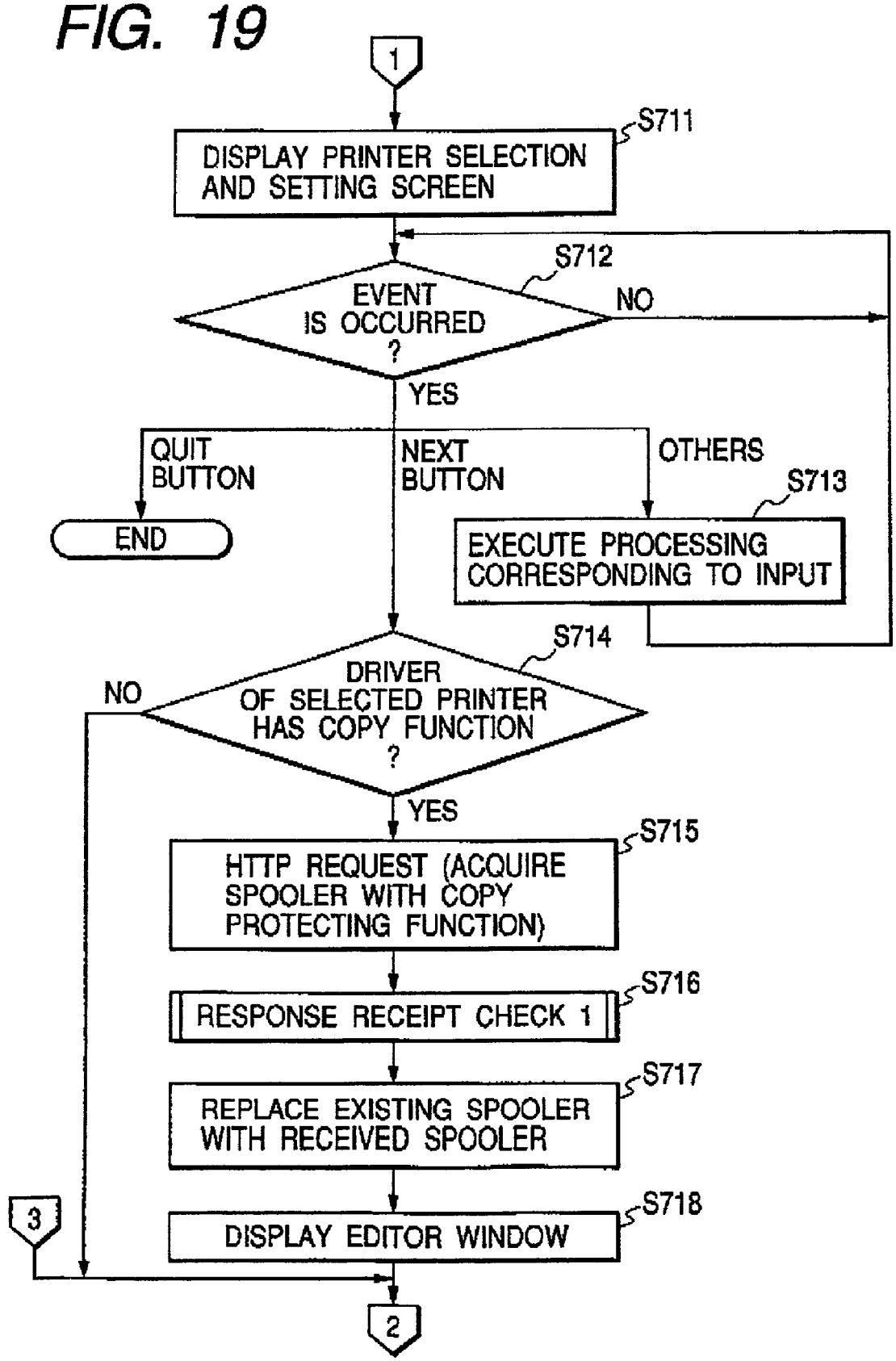
Figure 20:
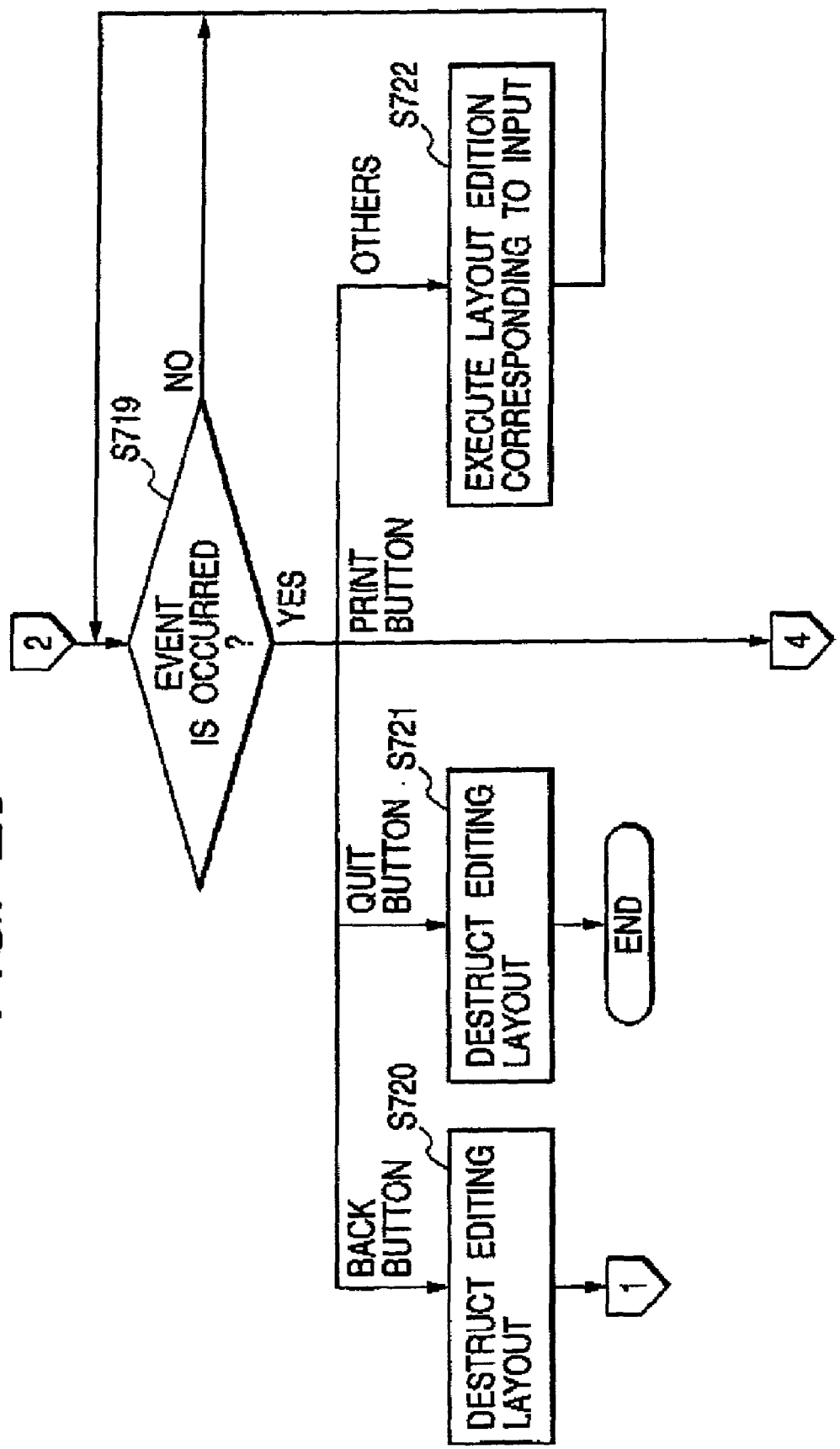
Figure 21:
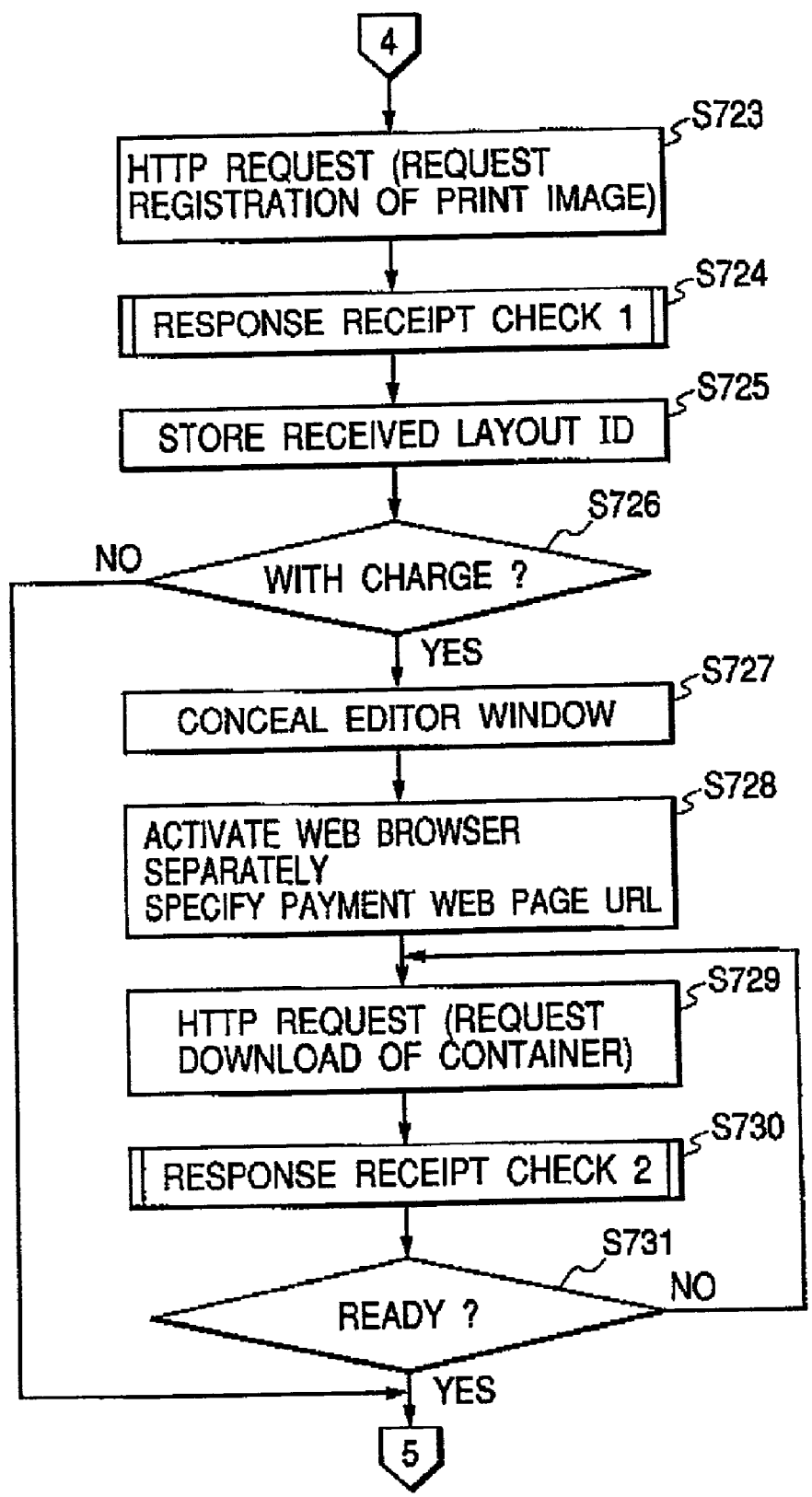
Figure 22:
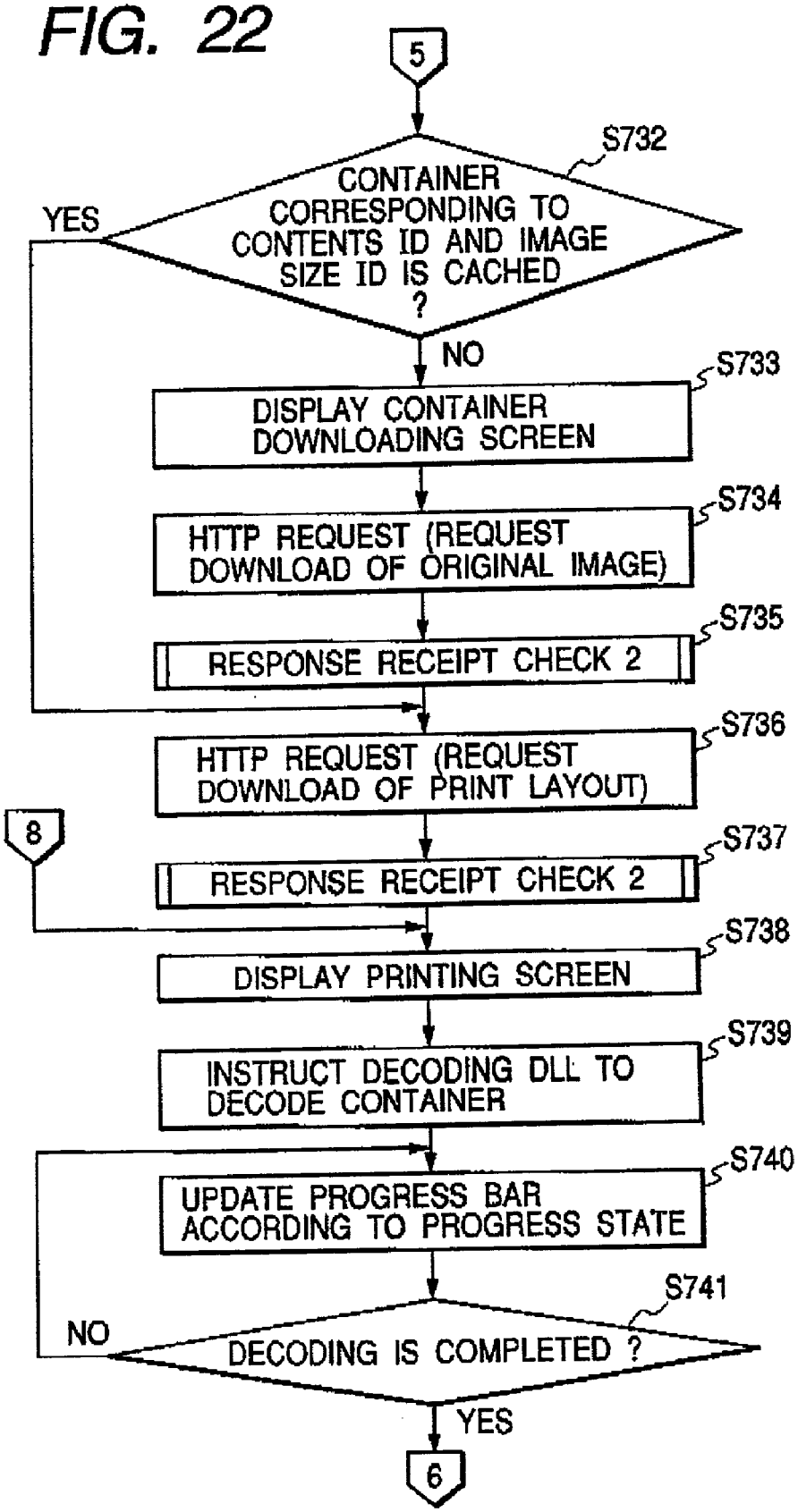
Figure 23:
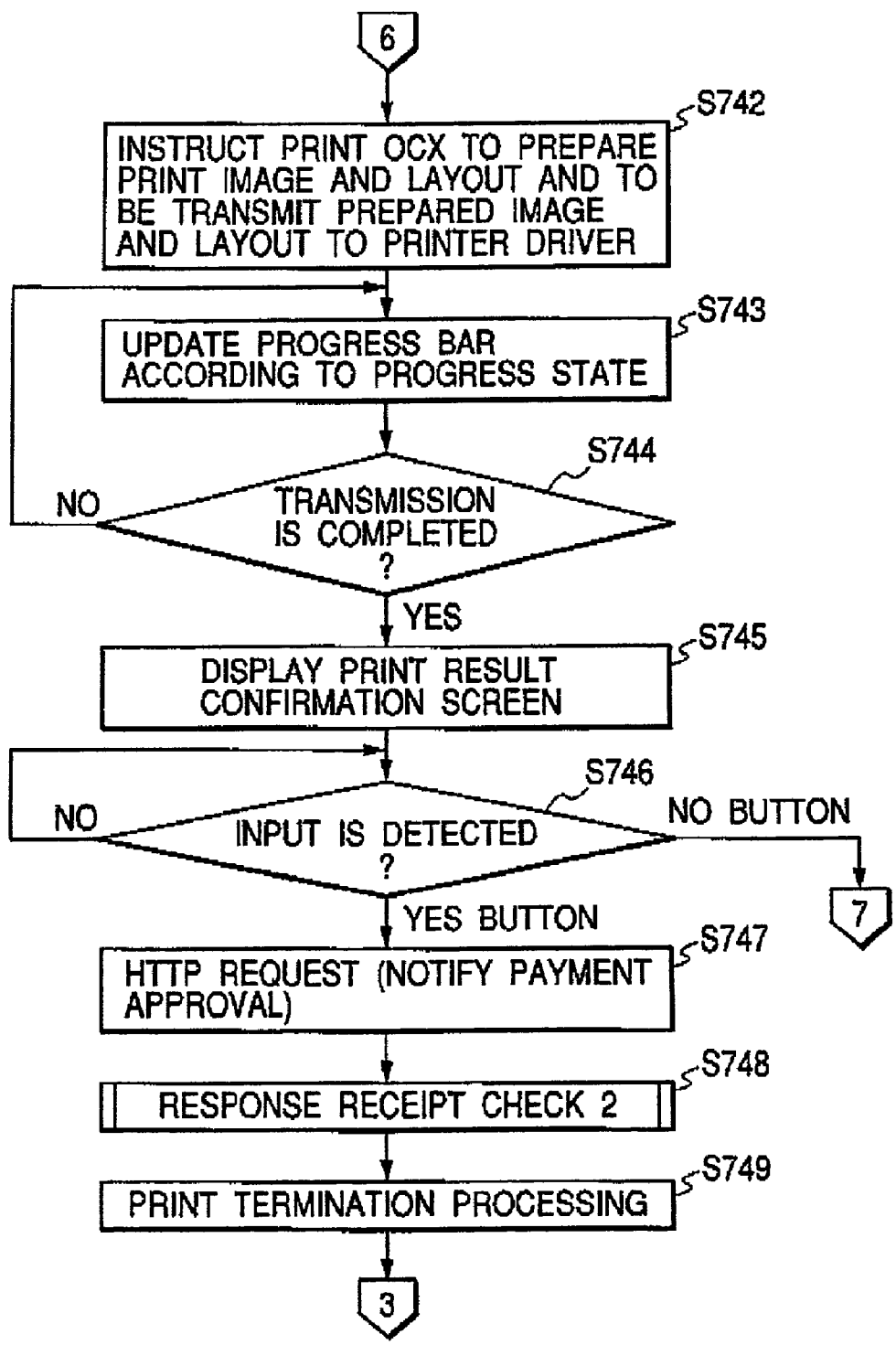
Figure 24:
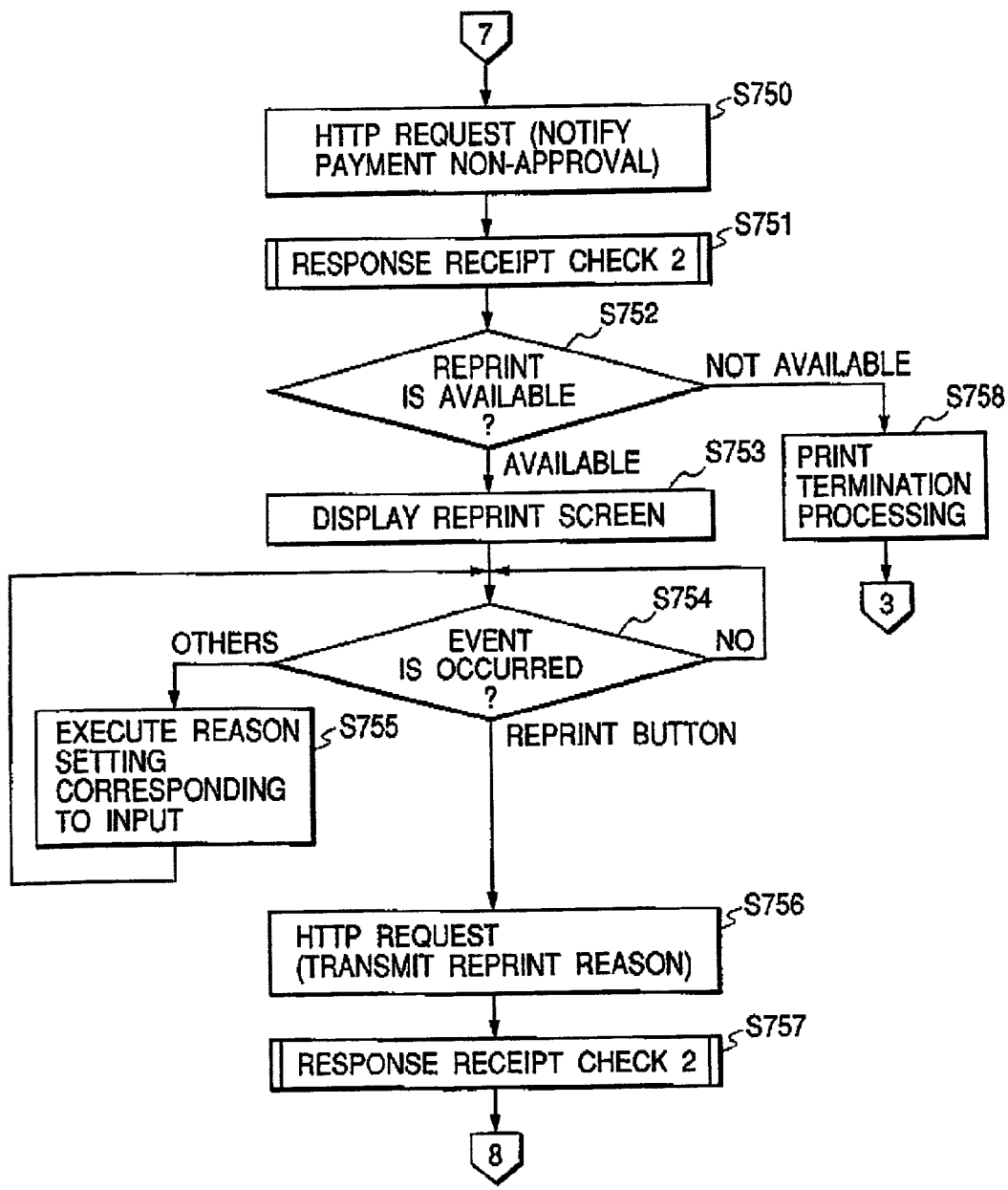

The activated image editor 52 specifies the user ID and the session ID and transmits an HTTP request message of an activating parameter acquisition request to the editor server 36 at S701 in FIG. 18.

At S901 (FIG. 27), the editor server 36 waits for an activating parameter acquisition request from the image editor 52. Upon reception of an activating parameter acquisition request, the editor server 36 advances the process from S901 to S902 and inquires of the database server 38 if the user of the user ID specified in the activating parameter acquisition request is logging in. Upon reception of the inquiry, the database server 38 retrieves login information in the membership database 44 based on the user ID and returns the login information in the entry containing the user ID to the editor server 36. The editor server 36 checks the reply contents from the database server 38 at S903. If the user is not logging in, the editor server 36 returns an error code to the image editor 52 at S904 and terminates the processing. In contrast, if the user is logging in, the editor server 36 reads the contents ID and the image size ID corresponding to the user ID and the session ID from the session ID management table 48 (FIG. 5) in the RAM 48 at S905. The editor server 36 combines other control parameters (the original image container storage location, etc., related to the contents ID in the contents database 43) with the contents ID and the image size ID to form activating parameters and transmits a response message storing the activating parameters to the image server 36. Then, the editor server 36 waits for an edit recourse acquisition request from the image editor 52 at S906.

After transmitting the HTTP request message at S701, the image editor 52 waits for a response message to the transmitted HTTP request message at S702. Specifically, the image editor 52 executes a first response reception check subroutine shown in FIG. 25 at S702.

Figure 41:
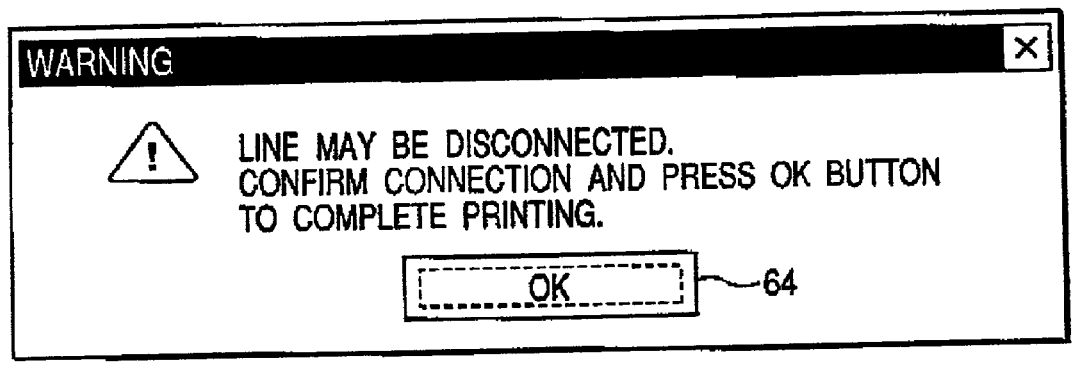
FIG. 41 is a drawing to show a warning screen example.

At S801 when the image editor 52 enters the subroutine, the image editor 52 checks whether the communication line between the user PC 2 and the server device 1 remains connected or is disconnected. If the communication line remains connected, the image editor 52 advances the process to S805. In contrast, if the communication line is disconnected, the image editor 52 interrupts any other processing at S802 and displays a warning screen shown in FIG. 41 on the display. As shown in FIG. 41, the warning screen contains only an OK button 64 as an operative item. After displaying the warning screen, the image editor 52 waits for the user to click on the ON button 64 at S803. If the user clicks on the OK button 64, the image editor 52 closes the warning screen at S804 and then returns the process to S801. Here, if the user clicks on the OK button 64 without taking steps to recover the communication line, it is again determined at S801 that the communication line is disconnected, and the warning screen is again displayed at S802. In contrast, if the user clicks on the OK button 64 with steps taken to recover the communication line, it is determined at S801 that the communication line is connected, the process proceeds to S805 and the interrupted processing is reactivated. Thus, if the communication line is disconnected, the process is not advanced, of course, and cannot be terminated either. Therefore, the fraud of the malicious user attempting to avoid charge by intentionally disconnecting the communication line after obtaining necessary information can be prevented.

At S805, the image editor 52 checks whether or not a response message has been received from the editor server 36. If a response message is not yet received from the editor server 36 (containing the case where an error code has been received), the image editor 52 checks whether or not the elapsed time since transmission of the HTTP request message exceeds a predetermined time limit. If the elapsed time exceeds the time limit, the image editor 52 advances the process to S808; if the elapsed time does not yet exceed the time limit, the image editor 52 advances the process to S807. At S807, the image editor 52 checks whether or not an error code has been received from the editor server 36. If an error code is not received, the process is returned to S801. In contrast, if an error code is received, the process is advanced to S808. At S808, the image editor 52 assumes that some trouble occurs in the editor server 36, and displays an error message on the display 22 and then terminates the processing.

Upon reception of a response message from the editor server 36 while the process loop of S801 to S807 described above is repeated, the image editor 52 exits the process loop at S805, terminates the first response reception check subroutine, and returns the process to the main routine in FIG. 18.

In the main routine in FIG. 18, the image editor 52 transmits an HTTP request message of an edit resource acquisition request specifying the user ID and the session ID to the editor server 36 at S703 following S702. Here, the edit resources are the layout image file indicating the contents of the image to be purchased (file of image data with a higher resolution than that of the above-described preview image, but a lower resolution than that of the original image used actually for print, namely, sample of digital contents) and the above-described original image attribute information (FIG. 2). After transmitting the above-mentioned HTTP request message at S703, the image editor 52 executes the first response reception check subroutine described above at S704, thereby waiting for a response message to the above-mentioned HTTP request message.

Upon reception of the edit resource acquisition request from the image editor 52, the editor server 36 advances the process from S906 to S907 and reads the contents ID and the image size ID corresponding to the user ID and the session ID specified in the edit resource acquisition request from the session ID management table 48 in the RAM 11. The editor server 36 receives the original image attribute information and the layout image data file storage location related to the combination of the contents ID and the image size ID in the contents database 43 from the database server 38. Further, the editor server 36 receives the layout image data file 41 stored in the above-mentioned layout image data file storage location from the file server 37. At 908 following S907, the editor server 36 compresses the original image attribute information and the layout image data file 41 received at S907 as edit resources and replies a response message storing the compressed edit resources to the image editor 52. Then, the editor server 36 waits for a printer performance information request from the image editor 52 at S909.

Upon reception of the edit resources from the editor server 36, the image editor 52 advances the process from S704 to S705 and detects all printer drivers 29 already installed on the hard disk 25. At S706 following S705, the image editor 52 checks whether or not the detected printer drivers 29 contain a printer driver to use a specific printer (printer supported in the digital contents providing service) as a local printer. If such a printer is not contained, the image editor 52 displays an error message on the display 22 at S707 and terminates the processing. In contrast, if such a printer is contained, the image editor 52 prepares a list of the printer driver names (printer driver identification information) of the printer drivers (printer drivers installed to use specific printers as local printers) at S708. At S709 following S708, the editor server 36 transmits an HTTP request message of a printer performance information acquisition request specifying the user ID, the session ID, and the OS ID to which the printer driver name list prepared at S708 is added, to the editor server 36. After transmitting the HTTP request message at S709, the image editor 52 executes the first response reception check subroutine described above at S710, thereby waiting for a response message to the above-mentioned HTTP request message.

Upon reception of the printer performance information acquisition request from the image editor 52, the editor server 36 advances the process from S909 to S910 and indicates combinations of the OS ID specified in the printer performance information acquisition request and the printer driver names in the printer driver name list and requests the database server 38 to retrieve the printer performance information corresponding to the combinations from the printer driver database 47. The database server 38 retrieves the corresponding printer performance information about those registered as those available in the printer driver database 47 in the received combinations from the printer driver database 47 and returns the printer performance information to the editor server 36. The editor server 36 replies a response message storing the printer performance information of available printers returned from the database server 38 to the image editor 52 at S911. Then, the editor server 36 waits for any request from the image editor 52 (a request for acquiring a spooler with copy protecting function or a print image registration request) at S912.

Figure 36:
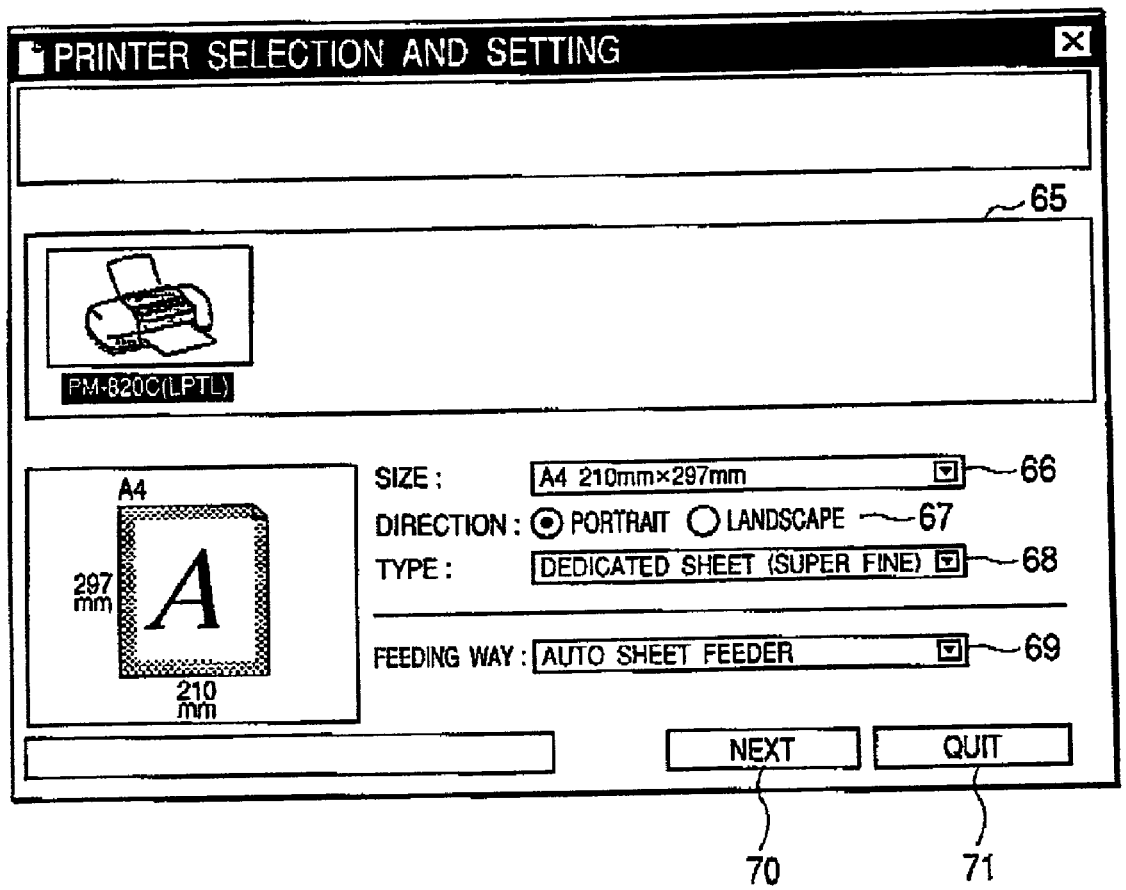
FIG. 36 is a drawing to show a printer selection and setting screen example.

Upon reception of the printer performance information from the editor server 36, the image editor 52 advances the process from S710 to S711 and displays a printer selection and setting screen as shown in FIG. 36 on the display 22 in accordance with the received printer performance information. This printer selection and setting screen contains a printer selection area 65 listing icons indicating the printer drivers corresponding to the received printer performance information, a paper size combo box 66 listing the printable paper sizes contained in the printer performance information about the printer driver selected as the user clicks on the corresponding icon in the printer selection area 65, a paper direction option button 67 to select the printable direction, a paper type combo box 68 listing printable paper types, a paper feeding way combo box 69 listing available paper feeders, a NEXT button 70, and a QUIT button 71.

Subsequently, the image editor 52 waits for input to the printer selection and setting screen at S712. When the user clicks on the QUIT button 71, the image editor 52 terminates the processing. If the user makes any entry other than clicking on the QUIT button 71 or the NEXT button 70, the image editor 52 executes processing responsive to the input at S713. Specifically, if the user clicks on any of the icons listed in the printer selection area 65, the printer driver corresponding to the icon is selected, the printable paper size corresponding to the printer driver becomes an option in the paper size combo box 66, the printable direction corresponding to the printer driver becomes selectable with the paper direction option button 67, the printable paper type corresponding to the printer driver becomes an option in the paper type combo box 68, and the available paper feeder corresponding to the printer driver becomes an option in the paper feeding way combo box 69. If the user clicks on either of the radio buttons making up the paper direction option button 67, the paper direction corresponding to the clicked radio button is set. If the user opens any of the combo boxes 66, 68, 69 and clicks on any of options listed in the opened combo box, the clicked option is set.

In contrast, if the user clicks on the NEXT button 70 at S712, the image editor 52 determines selection of the printer driver, setting of each combo box 66, 68, 69, and setting of the option button 67 at the point in time and checks whether or not the spooler of the selected printer driver 29 has a copy function at S714. If the spooler has no copy function, the image editor 52 advances the process to S719. In contrast, if the spooler has a copy function, the image editor 52 transmits an HTTP request message of a request for acquiring a spooler with copy protecting function specifying the user ID, the session ID, the OS ID, and the selected printer driver name to the editor server 36 at S715. After transmitting the HTTP request message at S715, the image editor 52 executes the first response reception check subroutine described above at S716, thereby waiting for a response message to the above-mentioned HTTP request message.

Upon reception of the request for acquiring a spooler with copy protecting function from the image editor 52, the editor server 36 advances the process from S912 to S913 and receives the spooler 55 with copy protecting function corresponding to the OS ID and the printer driver name specified in the request for acquiring a spooler with copy protecting function from the file server 37. At S914 following S913, the editor server 36 transmits a response message storing the spooler 55 with copy protecting function received at S913 to the image editor 52 and returns the process to S912.

Upon reception of the spooler 55 with copy protecting function from the editor server 36, the image editor 52 advances the process from S716 to S717 and replaces the spooler of the selected printer driver with the received spooler 55 with copy protecting function and then advances the process to S718.

Figure 37:
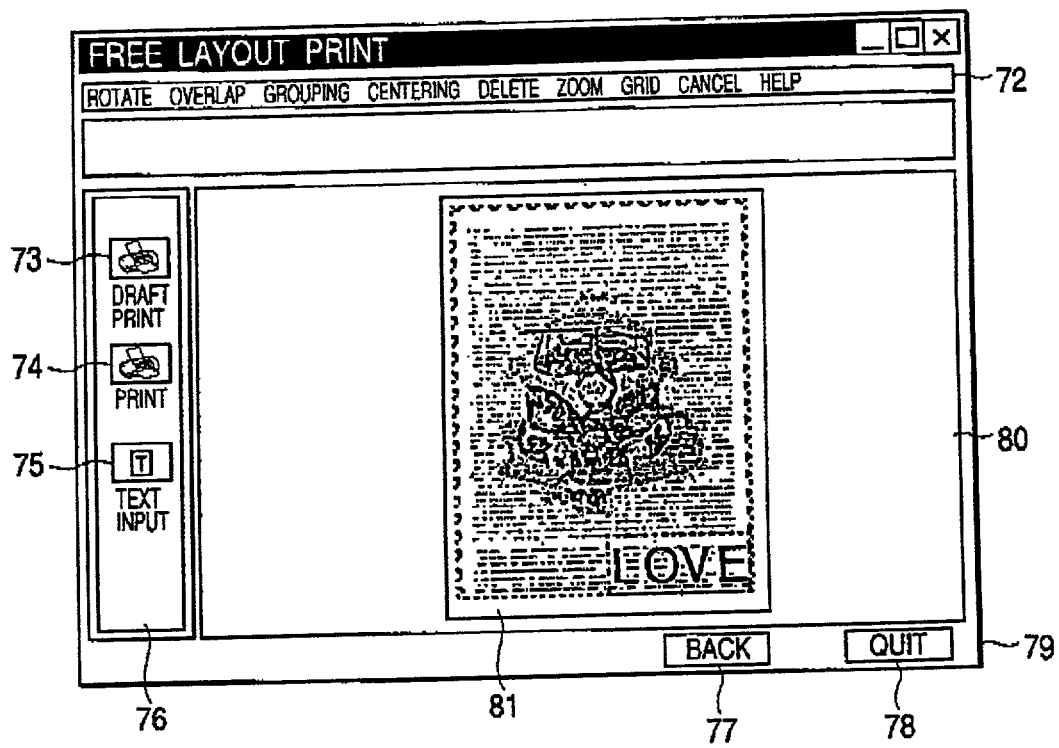
FIG. 37 is a drawing to show an editor window example.

At S718, the image editor 52 displays an editor window shown in FIG. 37 on the display 22 based on the layout image data file 41 contained in the edit resources received at S704. In the editor window, a menu bar 72 listing menus of ROTATE, OVERLAP, GROUPING, CENTERING, DELETE, ZOOM, GRID, CANCEL and HELP is placed along the upper margin of the editor window. A tool button panel 76 containing a DRAFT PRINT button 73, a PRINT button 74, and a TEXT INPUT button 75 is placed along the left margin of the edit window. Further, a tool bar 79 containing a BACK button 77 and a QUIT button 78 is placed along the lower margin. Another area in the editor window is an edit area 80. At the center of the edit area 80, an editor page 81 representing paper of the paper size selected in the paper size combo box 66 of the printer selection and setting screen (FIG. 36) is displayed in the paper direction selected with the paper direction option button 67. Inside the outer margin of the editor page 81, the printable range of the printer 4 is indicated by the dashed line. In the initial state, the image to be purchased is displayed fully in the printable range based on the layout image data.

Subsequently, the image editor 52 waits for input to the editor window at S719. If the user clicks on the QUIT button 78, the image editor 52 terminates the processing. If the user makes any entry other than clicking on the BACK button 77, the QUIT button 78, or the PRINT button 74, the image editor 52 executes layout edit of the print image responsive to the entered edit command in the editor page 81 at S722. For example, if the user clicks on ROTATE in the menu bar 72, a submenu to select the rotation angle (not shown) is displayed and further if the user clicks on any rotation angle in the submenu, the image to be purchased is rotated in the editor page 81 in the orientation corresponding to the selected rotation angle. If the user clicks on CENTERING in the menu bar 72, a submenu to select either CENTER OF PRINTABLE AREA or CENTER OF PAPER (not shown) is displayed and further if the user clicks on either option in the submenu, the image to be purchased is displayed at the maximum conforming to the condition and within the range not to change the aspect ratio of the image to be purchased. If the user clicks on ZOOM in the menu bar 72, a submenu to select a scaling factor (not shown) is displayed and further if the user clicks on any of the scaling factors in the submenu, the image to be purchased is scaled up or down conforming to the scaling factor and within the range not to change the aspect ratio of the image to be purchased. If the user clicks on GRID in the menu bar 72 and further clicks on any position in the printable area in the editor page 81, a grid is set with the position as the reference. Then, if the user clicks on the TEXT INPUT button 75 and enters characters through the input device 23, the entered characters are displayed in the grid. Such edit commands cannot always be entered and can be entered only within the range permitted by the original image attribute information contained in the edit resources, namely, only within the range in which the identity holding right of the copyright holder of the image to be purchased is not violated. Whenever completing edit at S722 in response to each edit command entry, the image editor 52 returns the process to S719. If the user clicks on the BACK button 77, the image editor 52 cancels the current layout being edited at S720, returns the process to S711, and again displays the printer selection and setting screen (FIG. 36).

In contrast, if the user clicks on the PRINT button 74 (corresponding to a print command entry), at S723, the image editor 52 transmits to the editor server 36 an HTTP request message of a print image registration request specifying the user ID, the session ID, the contents ID, and the image size ID, and the layout information defining the current layout in the editor page 81 (image position in print image, scaling factor, image inclination in print image, and character string and its position placed in print image). After transmitting the HTTP request message at S723, the image editor 52 executes the first response reception check subroutine described above at S724, thereby waiting for a response message to the above-mentioned HTTP request message. Upon reception of the print image registration request from the image editor 52, the editor server 36 advances the process from S912 to S915 and issues layout ID. At S916 following S915, the editor server 36 requests the database server 38 to retrieve in the contents database 43 using the combination of the contents ID and the image size ID specified in the print image registration request as retrieval condition. The database server 38 extracts the price (specific amount or no charge) and the storage location of the original image container 42 related to the contents ID and the image size ID of the retrieval condition in the contents database 43 from the contents database 43 and passes the price and the storage location of the original image container 42 to the editor server 36. Upon reception of the information, at S917 following S916, the editor server 36 puts the user ID, the session ID, and the layout information specified in the print image registration request, the layout ID issued at S915, and the original image container storage location into one print layout information file 49 according to a predetermined format as shown in FIG. 6. At this time, layout information exceeding the range previously permitted by the edit limitation in the original image attribute information will cause a syntax error to occur and thus such layout information is not put into the file. At S918 following S917, the editor server 36 temporarily stores the print layout information file 49 created at S917 in the RAM 11. At S919 following S918, the editor server 36 adds payment necessity information (if the price acquired at S916 means no charge, value "F"; if the price means charge, value "C") to the layout ID, stores in a response message, and returns the response message to the image editor 52. At S920 following S919, the editor server 36 checks whether or not the price acquired at S916 means no charge. If the price means no charge, the edit server 36 immediately advances the process to S926 and waits for a request from the image editor 52 (request to download original image, request to download print layout). In contrast, if the price does not mean no charge, the editor server 36 waits for a container download request from the image editor 52 at S921.

Upon reception of the layout ID and the payment necessity information from the editor server 36, the image editor 52 advances the process from S724 to S725 and stores the received layout ID in the RAM 24. At S726 following S725, the image editor 52 checks whether the value of the payment necessity information is "F (no charge)" or "C (charge)." If the value is "F (no charge)," the image editor 52 immediately advances the process to S732. In contrast, if the value is "C (charge)," the image editor 52 conceals at S727 the editor window displayed at S718. At S728 following S727, the image editor 52 separately activates the Web browser 27 to transmit information to check credit and gives an instruction for transmitting an HTTP request message containing the payment Web page URL. The processing contents of the Web browser 27 activated accordingly and the Web server 35 responding thereto are as previously described with FIGS. 9, 13, and 16, and the Web server 35 executes S523, whereby the payment state management table 46 is stored on the hard disk 12 as previously described. At S729 following S728, the image editor 52 transmits an HTTP request message specifying of a container download request specifying the user ID, the session ID, and the layout ID (digital contents request) to the editor server 36 (corresponding to first processing making a request for digital contents). After transmitting the HTTP request message at S729, the image editor 52 executes a second response reception check subroutine shown in FIG. 26 at S730, thereby waiting for a response message to the above-mentioned HTTP request message.

Figure 25:
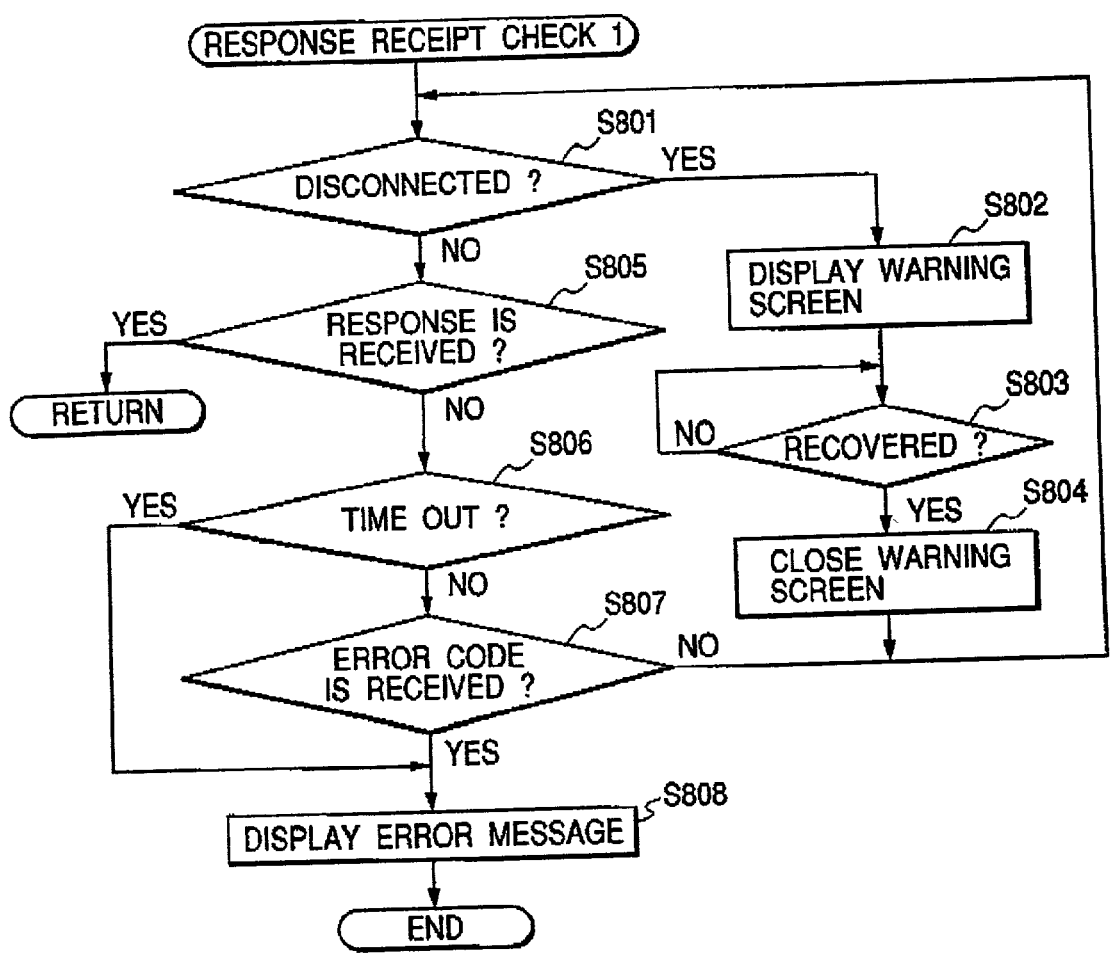
FIG. 25 is a flowchart to show a first response reception check subroutine executed by the image editor.
Figure 26:
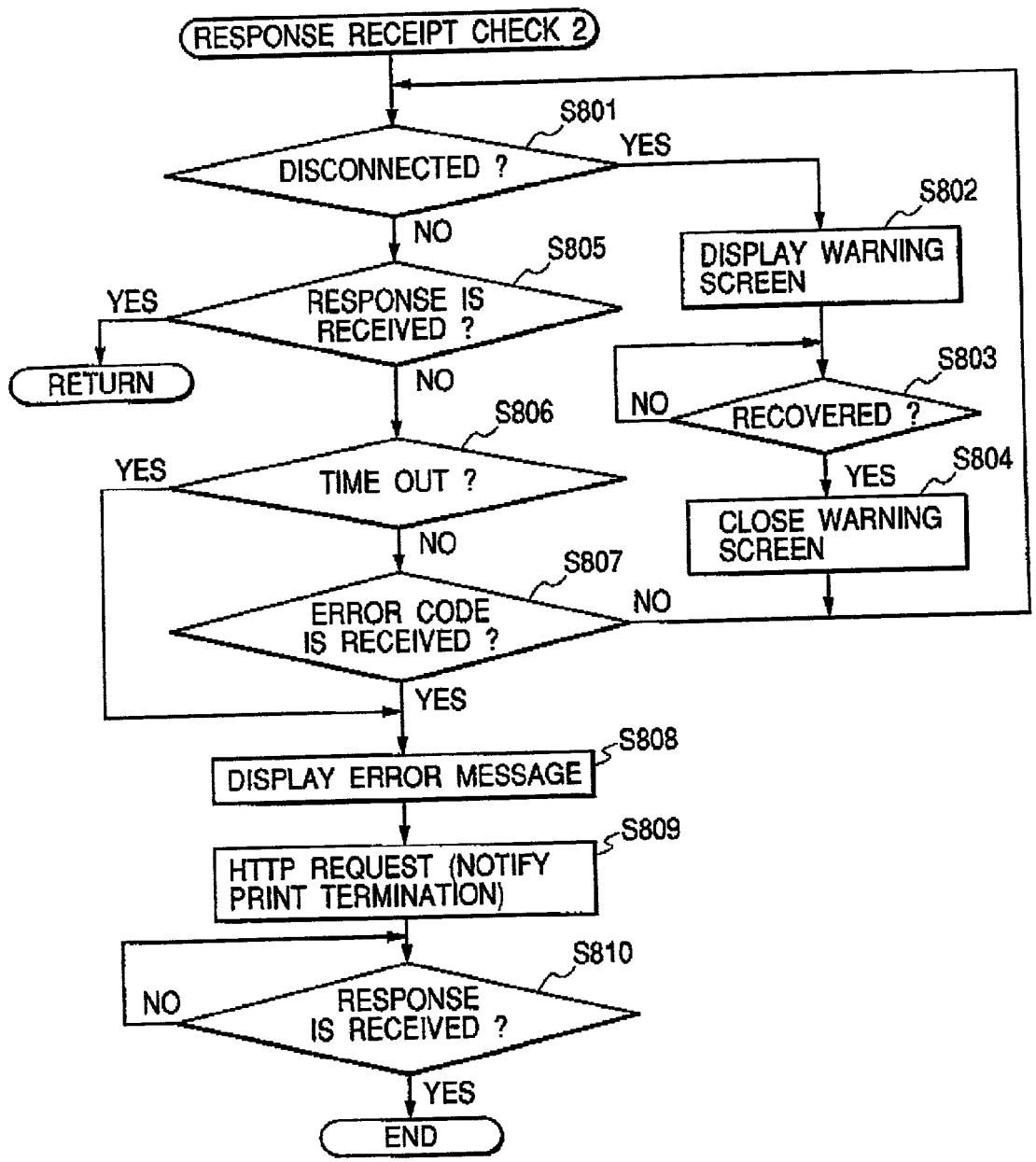
FIG. 26 is a flowchart to show a second response reception check subroutine executed by the image editor.
Figure 27:
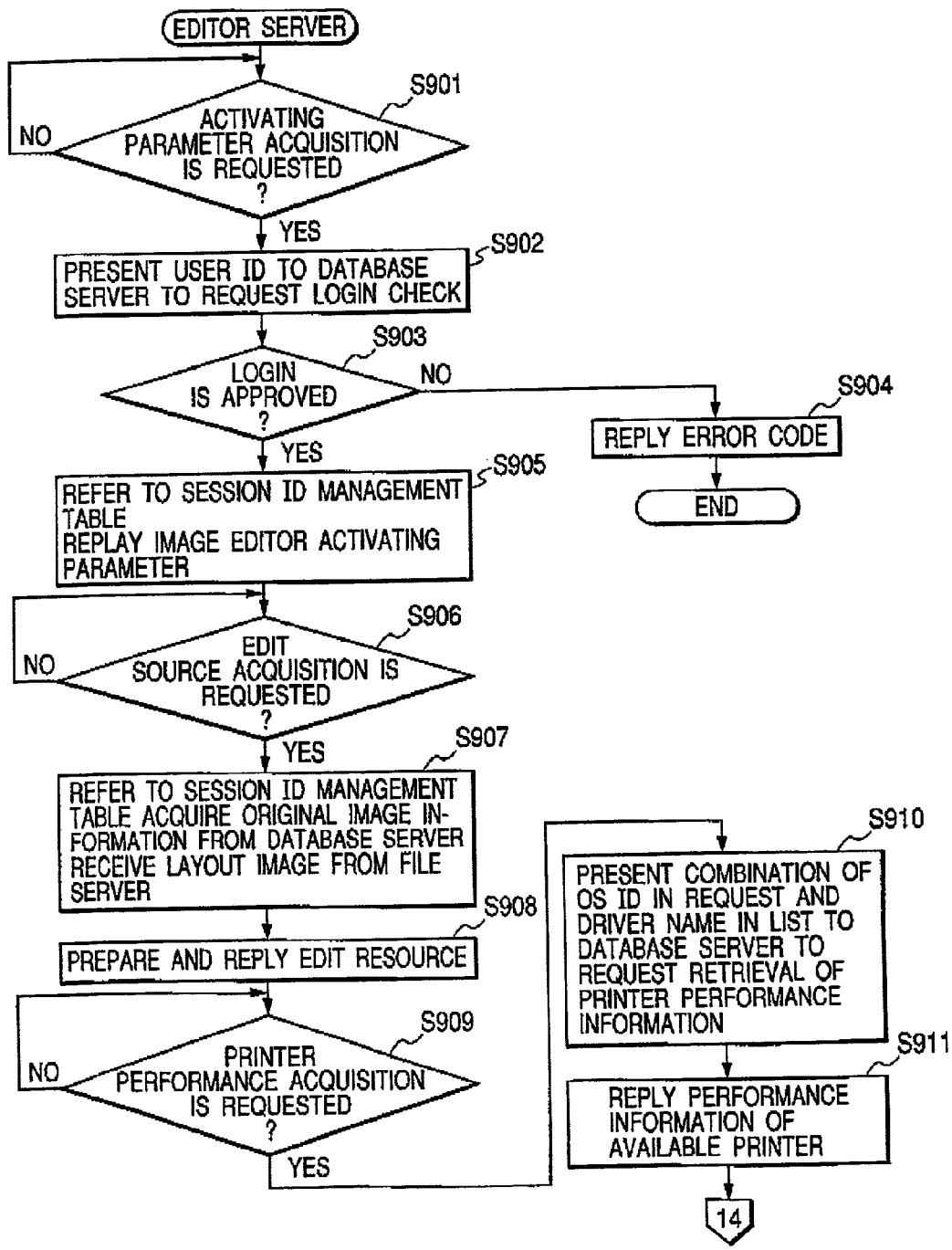
FIGS. 27 to 30 are flowcharts to show processing of an editor server device.
Figure 31:
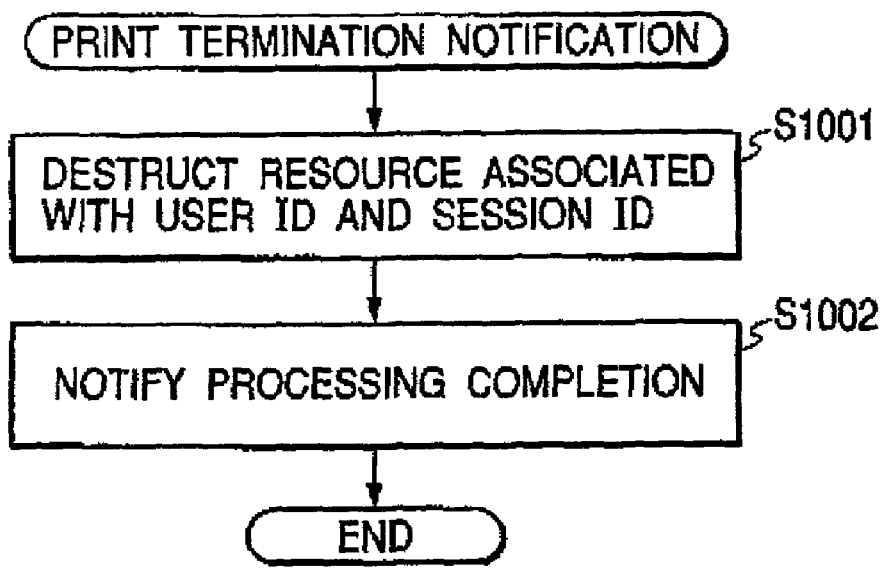
FIG. 31 is a flowchart to show termination notification processing executed by the editor server device which interrupts the current processing upon reception of a print processing termination notification.

The second response reception check subroutine shown in FIG. 26 differs from the first response reception check subroutine shown in FIG. 25 in that when the elapsed time since transmission of the HTTP request message exceeds the time limit (timeout) or when an error code is received, a termination notification is sent to the editor server 36 without immediately terminating the processing after an error message is displayed (S808). That is, in the second response reception check subroutine, after displaying an error message at S808, the image editor 52 transmits an HTTP request message of a termination notification of the print processing specifying the user ID and the session ID to the editor server 36 at S809. Then, at S810, the image editor 52 waits for a response message to the HTTP request message transmitted at S809. Upon reception of the termination notification of the print processing, the editor server 36 interrupts the current processing and activates termination notification processing shown in FIG. 31. At S1001, the editor server 36 cancels all resources related to the user ID and the session ID specified in the termination notification of the print processing (specifically, the payment state management table 46 on the hard disk 12 and the session ID management table 48 and the print layout information file 49 in the RAM 11), and transmits a response message storing a processing completion notification to the image editor 52 at S1002 following S1001. Upon reception of the processing completion notification, the image editor 52 terminates all processing. The reason why S809 and S810 are executed in the second response reception check subroutine is that when the second response reception check subroutine is executed, the above-mentioned resources are stored in the server device 1 and thus must be deleted.

On the other hand, upon reception of a container download request from the image editor 52, the editor server 36 advances the process from S921 to S922 and requests the database server 38 to retrieve the charging print status related to the user ID, the session ID, and the layout ID specified in the container download request in the payment state management table 46. At S923 following S922, the editor server 36 analyzes the retrieval result of the database server 38 responsive to the retrieval request at S922 and if the charging print status of a value of "1" or more is registered for the combination of the user ID, the session ID, and the layout ID mentioned above in the payment state management table 46, the editor server 36 determines that credit is already confirmed, and advances the process to S925; otherwise (if the combination itself of the user ID, the session ID, and the layout ID mentioned above is not registered or if the value of the charging print status related to the combination is "0"), the editor server 36 advances the process to S924. At S924, the editor server 36 replies a response message storing a wait command to the image editor 52. After completion of S924, the editor server 36 returns the process to S921 and waits for a container download request again transmitted by the image editor 52. In contrast, at S925, the editor server 36 replies a response message storing a ready notification to the image editor 52. After completion of S925, the editor server 36 advances the process to S926 and waits for a request from the image editor 52 (request to download original image, request to download print layout).

Upon reception of the wait command or the ready notification from the editor server 36, the image editor 52 advances the process from S730 to S731. At S731, the image editor 52 checks which of the wait command and the ready notification is received. If the image editor 52 determines that the wait command is received, the image editor 52 returns the process to S729 and again transmits an HTTP request message of a container download request. In contrast, if the image editor 52 determines that the ready notification is received, the image editor 52 advances the process to S732.

Figure 39:
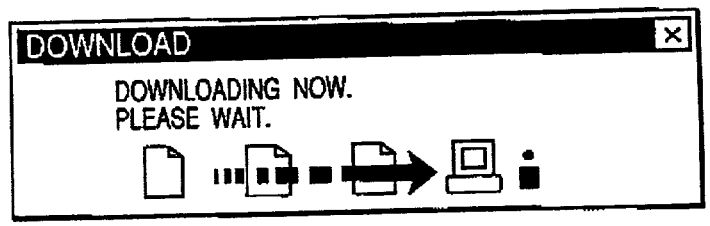
FIG. 39 is a drawing to show a container download screen example.

At S732, the image editor 52 checks whether or not the original image container 42 corresponding to the contents ID and the image size ID is already cached on the hard disk 25. If the original image container 42 is already cached, immediately the image editor 52 advances the process to S736. In contrast, if the original image container 42 is not yet cached, the image editor 52 advances the process to S733 and displays a container download screen shown in FIG. 39 on the display 22. At S734 following S733, the image editor 52 transmits an HTTP request message of an original image download request specifying the user ID, the session ID, and the layout ID to the editor server 36. After transmitting the HTTP request message at S734, the image editor 52 executes the second response reception check subroutine described above at S735, thereby waiting for a response message to the above-mentioned HTTP request message.

Upon reception of the original image download request from the image editor 52, the editor server 36 advances the process from S926 to S927, reads the PRINT image container storage location from the print layout information file 49 containing the user ID, the session ID, and the layout ID specified in the original image download request, and receives the original image container file 42 copied from the storage location from the file server 37. At S928 following S927, the editor server 36 stores the copied original image container file 42 in a temporary directory for work on the hard disk 12 for transmission. At S929 following S928, the editor server 36 replies a response message storing the original image container file 42 to the image editor 52. At S930 following S929, the editor server 36 deletes the original image container file 42 stored at S928 from the temporary file. Upon completion of S930, the editor server 36 returns the process to S926 and waits for a print layout download request from the image editor 52.

Upon reception of the original image container file 42 from the editor server 36, the image editor 52 advances the process from S735 to S736.

At S736, the image editor 52 transmits an HTTP request message of a print layout download request specifying the user ID, the session ID, and the layout ID to the editor server 36. After transmitting the HTTP request message at S736, the image editor 52 executes the second response reception check subroutine described above at S737, thereby waiting for a response message to the above-mentioned HTTP request message.

Upon reception of the print layout download request from the image editor 52, the editor server 36 advances the process from S926 to S931 and requests the database server 38 to retrieve the charging print status related to the user ID, the session ID, and the layout ID specified in the print layout download request in the payment state management table 46. At S932 following S931, the editor server 36 analyzes the retrieval result of the database server 38 responsive to the retrieval request at S931 and if the charging print status of a value of "1" or more is registered for the combination of the user ID, the session ID, and the layout ID mentioned above in the payment state management table 46, the editor server 36 determines that credit is already confirmed, and advances the process to S934; otherwise (if the combination itself of the user ID, the session ID, and the layout ID mentioned above is not registered or if the value of the charging print status related to the combination is "0"), the editor server 36 advances the process to S933. At S933, the editor server 36 replies a response message storing an error code to the image editor 52. Then, the image editor 52 executing the second response reception check subroutine in FIG. 26 at S737 as described above transmits a termination notification of the print processing to the editor server 36 (S809) and accordingly the editor server 36 interrupts the current processing and executes termination notification processing in FIG. 31, thereby canceling all resources related to the user ID and the session ID mentioned above (the payment state management table 46, the session ID management table 48, and the print layout information file 49) (S1001), and then all processing of the editor server 36 is complete.

In contrast, at S934, the editor server 36 generates a user key at random based on random numbers, etc. At S935 following S934, the editor server 36 receives the corresponding container key from the file server 37 with the storage location of the original image container 42 registered in the print layout information file 49 corresponding to the combination of the user ID, the session ID, and the layout ID mentioned above as a keyword. The editor server 36 encrypts the container key using the user key generated at S934. At S936 following S935, the image editor 52 deletes the original image container storage location from the print layout information file 49 corresponding to the combination of the user ID, the session ID, and the layout ID mentioned above, and embeds the user key generated at S934 and the container key encrypted at S935. The editor server 36 replies a response message storing the print layout information file 44 to the image editor 52. Upon completion of S936, the editor server 36 advances the process to S937 and waits for a request from the image editor 52 (payment approval notification or payment non-approval notification).

Figure 40:
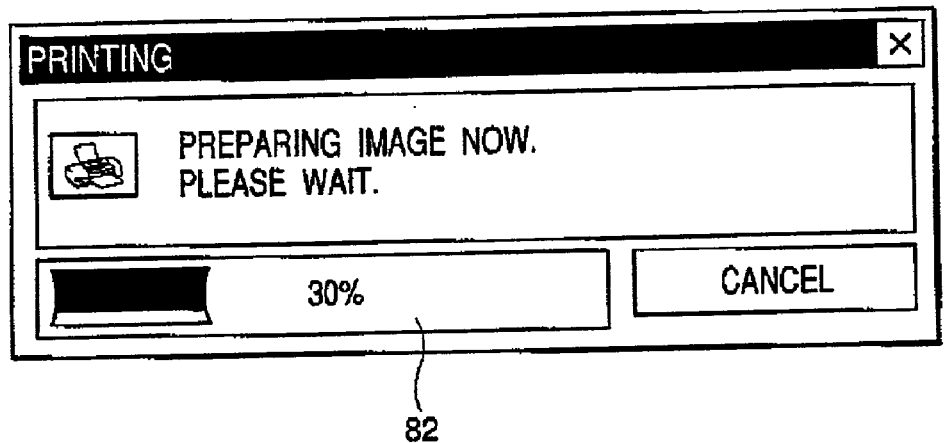
FIG. 40 is a drawing to show a print processing screen example.

Upon reception of the print layout information file 49, the image editor 52 prepares the received print layout information file 44 in the RAM 24 without storing the file on the hard disk 25, advances the process from S737 to S738, and displays a print processing screen shown in FIG. 40 on the display 22. The print processing screen contains a progress bar 82 representing the achievement percentage of processing to print completion. At S738, the progress bar 82 indicates 0%. At S739 following S738, the image editor 52 instructs the decoding DLL 53 to decode the original image container 42 downloaded at S735 or the cached original image container 42. Upon reception of the instruction, the decoding DLL 53 first decodes the container key using the user key embedded in the layout information file and further decodes the original image container 42 using the decoded container key, thereby decompressing the image data of the original image (JPEG data), and further prepares the image data of the original image (JPEG data) as bit map data. On the other hand, after giving the instruction at S739, the image editor 52 executes loop processing of S740 and S741. That is, at S740, the image editor 52 checks the processing progress state of the decoding DLL 53 at the point in time and changes the display form of the progress bar 82 in response to the progress state. At S741 following S740, the image editor 52 checks whether or not the processing of the decoding DLL 53 is complete. If the processing is not yet complete, the image editor 52 returns the process to S740. If it can be determined that the processing of the decoding DLL 53 is complete as a result of repeating the loop processing of S740 and S741, the image editor 52 advances the process to S742.

At S742, the image editor 52 instructs the print OCX 54 to execute print image expansion, layout, and transfer to the printer driver 29. Upon reception of the instruction, the print OCX 54 places the bit map data of the original image and character string in the area corresponding to the editor page 81 in the editor window in accordance with the print layout information, thereby preparing the print image data. The print OCX 54 transfers the complete print image data to the printer driver 29 selected at S712. The printer driver 29 to which the print image data is transferred converts the print image data into print data appropriate for the printer 4 to print and controls the printer 4 so as to print based on the print data. On the other hand, after giving the instruction at S742, the image editor 52 executes loop processing of S743 and S744. That is, at S743, the image editor 52 checks the processing progress state of the print OCX 54 and the printer driver 29 at the point in time and changes the display form of the progress bar 82 in response to the progress state. At S744 following S743, the image editor 52 checks whether or not the processing of the print OCX 54 and the printer driver 29 is complete. If the processing is not yet complete, the image editor 52 returns the process to S743. If it can be determined that the processing of the print OCX 54 and the printer driver 29 is complete as a result of repeating the loop processing of S743 and S744, the image editor 52 advances the process to S745.

Figure 42:
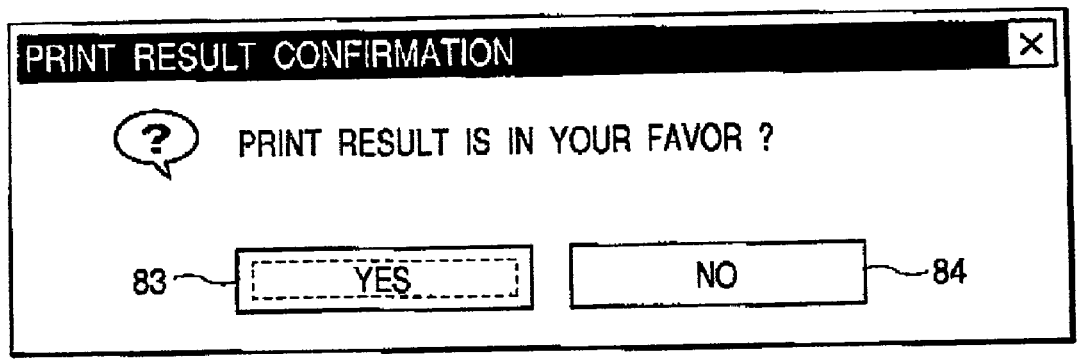
FIG. 42 is a drawing to show a print result check screen example.

At S745, the image editor 52 displays a print result check screen shown in FIG. 42 on the display 22. The print result check screen contains a YES button 83 and a NO button 84 each corresponding to an answer to the question "Print result is in your favor?" If the user sees the printed matter output from the printer 4 and ensures that the printed matter does not involve any problem of patchy, bleeding, etc., caused by trouble of the printer 4, the user clicks on the YES button 83; on the other hand, if such a problem is involved or printed matter cannot be provided because of a paper jam, etc., the user clicks on the NO button 84. The image editor 52 waits for the user to click on either button 83 or 84 at S746. If the user clicks on the YES button 83, the image editor 52 advances the process to S747; if the user clicks on the NO button 84, the image editor 52 advances the process to S750. At S747, the image editor 52 transmits an HTTP request message of a payment approval notification (information indicating that the print result is OK) specifying the user ID, the session ID, and the layout ID to the editor server 36 (corresponding to third processing of transmitting information indicating whether or not the print result is OK). After transmitting the HTTP request message at S747, the image editor 52 executes the second response reception check subroutine described above at S748, thereby waiting for a response message to the above-mentioned HTTP request message.

Upon reception of the payment approval notification from the image editor 52, the editor server 36 advances the process from S937 to S938 and replies a response message storing an answer of "OK" to the image editor 52. Subsequently, at S939, the editor server 36 requests the database server 38 to change the value of the charging print status related to the combination of the user ID, the session ID, and the layout ID specified in the payment approval notification in the payment state management table 46 to "5" indicating charging confirmation and set a sale check flag (corresponding to charging processing). At S940 following S939, the editor server 36 deletes the print layout information file 49 corresponding to the combination of the user ID, the session ID, and the layout ID specified in the payment approval notification from the RAM 11. Upon completion of S940, the editor server 36 returns the process to S912 and waits for the image editor 52 to transmit a print image registration request based on another edit.

Upon reception of the answer of "OK" from the edit server 36, the image editor 52 advances the process from S748 to S749 and executes print termination processing. That is, the image editor 52 excludes the original image container file 42 cached on the hard disk 25 and discards all resources concerning the layout ID remaining in the user PC 2 (print image data, print layout information file 49, and layout ID). Upon completion of S749, the image editor 52 returns the process to S718 and again displays the editor window, thereby enabling the user to again edit the screen of the image to be purchased or click on the QUIT button 78.

On the other hand, at S750 executed if the user clicks on the NO button 84 on the print result check screen described above, the image editor 52 transmits an HTTP request message of a payment non-approval notification (information indicating that the print result is NG) specifying the user ID, the session ID, and the layout ID to the editor server 36 (corresponding to third processing of transmitting information indicating whether or not the print result is OK). After transmitting the HTTP request message at S750, the image editor 52 executes the second response reception check subroutine described above at S751, thereby waiting for a response message to the above-mentioned HTTP request message.

Upon reception of the payment non-approval notification from the image editor 52, the editor server 36 advances the process from S937 to S941 and requests the database server 38 to increment by one the value of the charging print status related to the combination of the user ID, the session ID, and the layout ID specified in the payment non-approval notification in the payment state management table 46. At S942 following S941, the editor server 36 checks whether or not the value of the charging print status after incremented by one reaches "4" indicating "print processing termination." If the value of the charging print status does not yet reach "4," the editor server 36 replies a response message storing an answer of "reprintable" (reprint permission) to the image editor 52 at S944 and waits for transfer of a reprint reason from the image editor 52 at S945.

Figure 43:
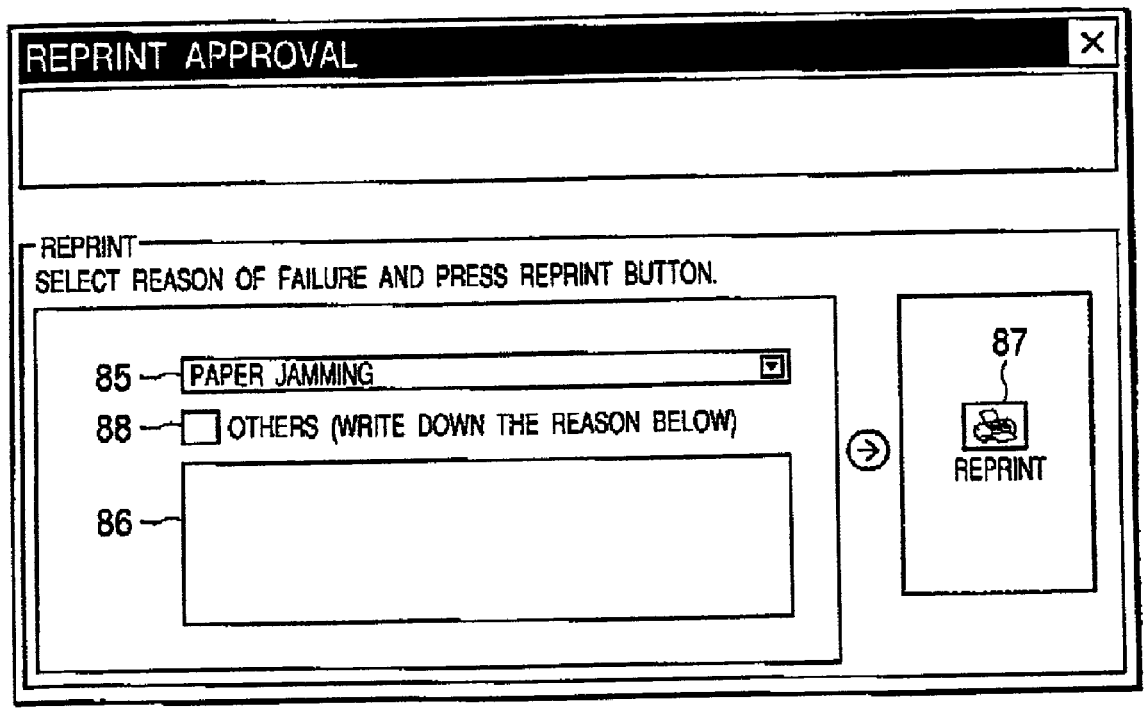
FIG. 43 is a drawing to show a reprint processing screen example.

Upon reception of the answer of "reprintable" from the editor server 36, the image editor 52 advances the process from S751 to S752 and further to S753. At S753, the image editor 52 displays a reprintable processing screen shown in FIG. 43 on the display 22. This reprintable processing screen contains a combo box 85 to select a typical reprint reason, a text box 86 where a specific reprint reason can be written, a REPRINT button 87, and a check box 88. Subsequently, the image editor 52 waits for the user to perform operation on the reprintable processing screen and if the user performs any operation other than clicking on the REPRINT button 87, the image editor 52 sets the reprint reason responsive to the contents of the operation at S755 and returns the process to S754. For example, if the user performs operation to open the combo box 85, the image editor 52 lists previously listed-up typical reprint reasons and if the user clicks on any typical reprint reason out of the list, the image editor 52 sets the clicked reprint reason. If the user checks the check box 88, the image editor 52 sets the contents subsequently entered in the text box 86 by the user. In contrast, if the user clicks on the REPRINT button 87, the image editor 52 transmits an HTTP request message of reprint reason transfer specifying the reprint reason setup at the point in time, the user ID, the session ID, and the layout ID to the editor server 36 at S756. After transmitting the HTTP request message at S756, the image editor 52 executes the second response reception check subroutine described above at S757, thereby waiting for a response message to the above-mentioned HTTP request message.

Upon reception of the reprint reason transfer from the image editor 52, the editor server 36 advances the process from S945 to S946 and requests the database server 38 to register the reprint reason specified in the reprint reason transfer in the reprint reason table 45. As shown in FIG. 8, for each reprint reason ID to identify each reprint reason, the contents of the reprint reason and the layout ID are registered in relation to each other in the reprint reason table 45. Subsequently, the editor server 36 replies a response message storing an answer of "OK" to the image editor 52 at S947, returns the process to S937, and waits for a request from the image editor 52 (payment approval notification or payment non-approval notification).

Upon reception of the answer of "OK" from the editor server 36, the image editor 52 returns the process from S757 to S738 and again attempts to print.

In contrast, if the editor server 36 determines at S942 that the value of the charging print status reaches "4," the editor server 36 transmits a response message storing an answer of "reprint forbiddance" to the image editor 52 at S943. As with the case where the payment approval notification is received described above, at S939, the editor server 36 requests the database server 38 to change the value of the charging print status related to the combination of the user ID, the session ID, and the layout ID specified in the payment non-approval notification in the payment state management table 46 to "5" indicating charging confirmation and set the sale check flag, and at S940 following S939, the editor server 36 deletes the print layout information file 49 corresponding to the combination of the user ID, the session ID, and the layout ID specified in the payment non-approval notification from the RAM 11 and returns the process to S912.

Upon reception of the answer of "reprint forbiddance" from the editor server 36, the image editor 52 advances the process from S751 to S752 and further to S758. At S758, the image editor 52 executes the same print termination processing as at S749. After completion of S758, the image editor 52 returns the process to S719.

When the user wants to purchase another image (purchase printed matter), the user performs operation for causing the Web browser 27 to display any list screen and then to display a preview screen about any image. The user clicks on the PRINT button 155 on the preview screen. Accordingly, another session ID is issued, an image editor CAB file 50 is downloaded into the user PC 2 from the server device 1, and the image editor 52 is again executed at the user PC 2.

As the described processing is executed repeatedly, purchase record (date, price, personal information, credit card information, and sale check flag) for each layout ID (corresponding to each print result) is left in the payment state management table 46 for each session ID (corresponding to the image to be purchased). Then, for example, on the adding-up day for each month, a totalizing program (not shown) is executed, the purchase records left in the payment state management table 46 are totalized for each user, and a bill of the totalized price is charged to the credit card company registered for each user. Upon reception of the bill, the credit card company pays the claimed price in advance and performs processing to receive payment of the claimed price from the user's bank account previously registered.

According to the embodiment, if the user transmits an HTTP request message of an image editor activating page acquisition request to the server device 1, unless the user is logging in, the Web server 35 does not return the image editor activating page ASP and consequently the image editor CAB file 50 containing the image editor Java application 52 is not downloaded into the user PC 2. Therefore, information concerning the purchase of original image data is not transmitted at all to the user who does not disclose his or her personal information of the name, the address, the credit card number, etc.

According to the embodiment, whenever the user determines the image to be purchased and transmits an HTTP request message of an image editor activating page acquisition request to the server device 1, the session ID to uniquely identify connection for purchasing the image to be purchased is issued, and later only the user PC 2 holding the session ID can continue the transaction procedure of the image to be purchased. Therefore, another person can be prevented from continuing the procedure as if he or she were the user holding the session ID and in addition, the user holding the session ID cannot continue the procedure using a different terminal. Consequently, the whole purchase procedure is completed only at the same user PC 2 and thus various pieces of data are prevented from being scattered and lost and unmanageable.

According to the embodiment, the combination of the contents ID and the image size ID to identify the image to be purchase is sent from the Web browser 27 to the Web server 35 and is sent as activating parameters from the editor server 36. That is, the parameters are automatically set in the image editor 52 and thus need not be shown for the user, so that high-level security is maintained.

According to the embodiment, the printer performance information of all printers supported by the digital contents providing system is not sent to the image editor 52 and only the printer performance information of the printer 4 connected locally to the user PC 2 is sent to the image editor 52. Accordingly, the information amount transferred from the server device 1 to the user PC 2 is reduced and thus the communication load may be small.

According to the embodiment, the layout information specifying the layout edited on the editor window is not put into a file in the user PC 2 and is put into a print layout information file 49 in the server device 1 after it is transferred to the editor server 36. After credit confirmation to the user is confirmed and the original image container 42 the user PC 2 is downloaded, downloaded from the server device 1 to the user PC 2 immediately before print based on the original image container 42 is executed. Therefore, the layout at the final printing time is managed by the editor server 36 and thus the layout exceeding the permitted range is excluded. That is, if the user edits the image exceeding the range permitted by the original image attribute information by some means in the user PC 2, the contents of such edit will cause a syntax error to occur when the contents are transmitted to the editor server 36 and put into a file, so that the contents are not reflected on the print result. Consequently, the identity holding right of the copyright holder of the image to be purchased is prevented from being violated.

According to the embodiment, the original image container 42 is downloaded from the server device 1 to the user PC 2 only after credit confirmation to the user is confirmed. Therefore, the original image data is prevented from being transmitted to the malicious user declaring false card information at the membership registering time.

According to the embodiment, the original image container 42 copied into the temporary directory to download to the user PC 2 is deleted immediately after the original image container 42 is downloaded to the user PC 2. Therefore, the possibility that the original image container 42 will be illegally accessed from the outside of the server device 1 is decreased.

According to the embodiment, when the layout information is downloaded from the server device 1 to the user PC 2 just before print, whether or not credit is granted to the user of the user PC 2 is checked. Therefore, the user from whom charge cannot be collected is prevented from printing.

According to the embodiment, if printed matter is not printed normally because of trouble, etc., of the printer 4, print can be executed up to twice. The user can obtain printed matter matching the charged price by trying reprint. If printed matter of too much poor quality is output and is appreciated by the user, the identify holding right of the copyright holder is not guaranteed. In contrast, if the printer 4 fails, finally satisfactory printed matter cannot be provided even if print is executed again and again. There is also a possibility that the malicious user attempts to reprint although normal print is accomplished. Thus, in the embodiment, the number of reprintable times is limited to two and when print has been executed twice, charging confirmation processing is performed.

Although the invention has been described in the specific embodiment, it is to be understood that the invention is not limited to the specific embodiment and is applied to other embodiments in the scope defined in the claims.

What is claimed is:

1. A method of providing digital contents from a server device to a user terminal, which is communicable with the server device via a network, in response to a request issued from the user terminal, the method comprising:
   causing the user terminal to request acquisition of a sample of the digital contents to the server device, in response to an instruction inputted through an input device;
   causing the server device to transmit the sample of the digital contents to the user terminal, in response to the acquisition request;
   causing the user terminal to edit a print image layout including a sample transmitted from the server device, in response to an edit instruction inputted through the input device;
   causing the user terminal to transmit layout information indicating the print image layout to the server device, in response to a print instruction inputted through the input device;
   causing the server device to determine whether or not the layout information transmitted from the user terminal is permitted by an edit limitation, the edit limitation defining a position of the sample in the print image layout;
   causing the server device to transmit the layout information to the user terminal after transmitting image data of the digital contents to the user terminal when the layout information is permitted by the edit limitation;
   causing the user terminal to prepare a print image based on the image data of the digital contents and the layout information file which are transmitted from the server device; and
   causing a printer to print the print image.

2. A server device, comprising:
   a processor, which executes processing according to a program;
   a communicator, which communicates with a user terminal connected via a network; and
   a storage medium, which stores digital contents and samples thereof, the storage medium storing a server program which causes the processor to:
     transmit a sample of the digital contents to the user terminal, when a request is transmitted from the user terminal;
     receive layout information transmitted from the user terminal;
     determine whether or not the received layout information is permitted by an edit limitation, the edit limitation defining a position of the sample in a print image layout; and
     transmit the layout information to the user terminal after transmitting image data of the digital contents to the user terminal when the layout information is permitted by the edit.

3. The server device as set forth in claim 2, wherein the user terminal includes a processor, an input device, and a printer, and the storage medium stores a client program which causes the processor in the user terminal to:
   request acquisition of a sample of the digital contents to the server device, in response to an instruction inputted through the input device;

edit the print image layout including a sample transmitted from the server device, in response to an edit instruction inputted through the input device;

transmit the layout information indicating the print image layout to the server device, in response to a print instruction inputted through the input device;

prepare a print image based on image data of the digital contents and the layout information which are transmitted from the server device; and cause the printer to print the print image;

the server program causes the processor in the server device to transmit the client program to the user terminal when a request for acquiring the client program is received from the user terminal.

4. The server device as set forth in claim 2, wherein the layout information includes information indicating a position of a digital contents image in the print image layout.

5. The server device as set forth in claim 2, wherein the layout information includes information indicating a direction of a digital contents image in the print image layout.

6. The server device as set forth in claim 2, wherein the layout information includes information indicating texts arranged in the print image layout.

7. The server device as set forth in claim 2, wherein the image data of the digital contents transmitted to the user terminal is encrypted, and the server program causes the processor in the server device to transmit decryption information for decrypting the end image data to the user terminal so as to correspond to the layout information.

8. The server device as set forth in claim 2, wherein the server program causes the processor in the server device to:
   execute the credit confirmation based on a credit information transmitted from the user terminal: and
   transmit the layout information only when the credit confirmation is succeeded.

9. The server device as set forth in claim 7, wherein the layout information includes the decryption information.

10. The server device as set forth in claim 2, wherein the image data of the digital contents transmitted to the user terminal is encrypted, and the image data of the digital contents is decrypted when the layout information which is permitted by the edit limitation is used to print the image data of the digital contents.

11. A user terminal, comprising:
   a processor which executes processing according to a program;
   an input device which inputs various instruction to the processor in accordance with a user's operation;
   a communicator which communicates with a server device via a network;
   a storage medium which is configured to store a client program which causes the processor to:
      request acquisition of a sample of a digital contents to the server device;
      edit a print image layout including the sample transmitted from the server device in response to an edit instruction inputted through the input device;
      transmit layout information indicating the print image layout to the server device;
      receive the layout information permitted by an edit limitation in the server device and image data of the digital contents which are transmitted from the server device, the edit limitation defining a position of the sample in the print image layout; and
      prepare a print image based on the image data of the digital contents and the layout information.

12. The user terminal as set forth in claim 11, further comprising:
   a display which displays the print image layout while the edit processing is performed.

13. The user terminal as set forth in claim 11, wherein the layout information includes information indicating a position of a digital contents image in the print image layout.

14. The user terminal as set forth in claim 11, wherein the layout information includes information indicating a direction of a digital contents image in the print image layout.

15. The user terminal as set forth in claim 11, wherein the layout information includes information indicating texts arranged in the print image layout.

16. The user terminal as set forth in claim 11, wherein the image data of the digital contents transmitted to the user terminal is encrypted, and the client program causes the processor to receive decryption information for decrypting the encrypted image data, the decryption information corresponding to the layout information.

17. The user terminal as set forth in claim 11, wherein the client program causes the processor to:
   transmit credit information for credit confirmation of the user to the server device; and
   receive the layout information only when the credit confirmation is succeeded.

18. The user terminal as set forth in claim 16, wherein the layout information includes the decryption information.

19. The user terminal set forth in claim 11, wherein the image data of the digital contents transmitted from the server device is encrypted, and the client program causes the processor to decrypt the image data of the digital contents when the layout information which is permitted by the edit limitation is used to print the image data of the digital contents.

* * * * *